US011235549B2

(12) United States Patent
Nitta

(10) Patent No.: US 11,235,549 B2
(45) Date of Patent: Feb. 1, 2022

(54) CORRUGATING ROLL UNIT CONVEYANCE APPARATUS AND APPARATUS AND METHOD FOR REPLACING CORRUGATING ROLL UNIT

(71) Applicant: MITSUBISHI HEAVY INDUSTRIES MACHINERY SYSTEMS, LTD., Hyogo (JP)

(72) Inventor: Takashi Nitta, Hyogo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 190 days.

(21) Appl. No.: 16/479,914

(22) PCT Filed: Oct. 17, 2017

(86) PCT No.: PCT/JP2017/037595
§ 371 (c)(1),
(2) Date: Jul. 22, 2019

(87) PCT Pub. No.: WO2018/135054
PCT Pub. Date: Jul. 26, 2018

(65) Prior Publication Data
US 2019/0381756 A1  Dec. 19, 2019

(30) Foreign Application Priority Data
Jan. 23, 2017  (JP) .............................. JP2017-009443

(51) Int. Cl.
*B31F 1/28* (2006.01)
*B29C 53/24* (2006.01)
*B65H 19/12* (2006.01)

(52) U.S. Cl.
CPC ............ *B31F 1/2804* (2013.01); *B29C 53/24* (2013.01); *B31F 1/2863* (2013.01);
(Continued)

(58) Field of Classification Search
None
See application file for complete search history.

(56) References Cited

U.S. PATENT DOCUMENTS 3,618,355 A * 11/1971 Brahm et al. ......... B21B 31/103
72/238
3,699,796 A   10/1972 Eibe et al.
(Continued)

FOREIGN PATENT DOCUMENTS

JP    S60175626 U   11/1985
JP    S6234611 A    2/1987
(Continued)

OTHER PUBLICATIONS

International Search Report and Written Opinion for International Application No. PCT/JP2017/037595 dated Dec. 19, 2017; 23 pp.
(Continued)

*Primary Examiner* — Barbara J Musser
(74) *Attorney, Agent, or Firm* — Hauptman Ham, LLP

(57) ABSTRACT

A corrugating roll unit conveyance apparatus includes a mounting base having a first accommodation part for accommodating a corrugating roll unit to be removed and a second accommodation part for accommodating a corrugating roll unit to be installed; and a movement device for moving the mounting base to a first replacement position at which the first accommodation part faces the existing corrugating roll unit, a second replacement position at which the second accommodation part faces a space from which the existing corrugating roll unit has been removed, and a retracted position separated from the first replacement position and the second replacement position.

16 Claims, 16 Drawing Sheets

(52) U.S. Cl.
CPC .......... *B31F 1/2868* (2013.01); *B31F 1/2877* (2013.01); *B65H 19/12* (2013.01); *B65H 2301/5122* (2013.01)

(56) References Cited

U.S. PATENT DOCUMENTS

| | | |
|---|---|---|
| 3,876,087 A | 4/1975 | Osta |
| 4,481,066 A | 11/1984 | Hirakawa et al. |
| 5,549,044 A | 8/1996 | Achelpohl |
| 5,715,749 A | 2/1998 | Miller |
| 6,155,320 A | 12/2000 | Finke et al. |
| 7,617,856 B2 | 11/2009 | Gnan |
| 2007/0084565 A1* | 4/2007 | Gnan .................. B31F 1/2868 156/462 |
| 2008/0308233 A1 | 12/2008 | Nitta |
| 2015/0030713 A1 | 1/2015 | Yamada et al. |
| 2015/0266257 A1 | 9/2015 | Gruenwald et al. |

FOREIGN PATENT DOCUMENTS

| | | |
|---|---|---|
| JP | 07040836 A | 2/1995 |
| JP | 08001213 A | 1/1996 |
| JP | 11198256 A | 7/1999 |
| JP | 2009196330 A | 9/2009 |
| JP | 2009196331 A | 9/2009 |
| JP | 4418466 B2 | 2/2010 |
| JP | 2015024577 A | 2/2015 |

OTHER PUBLICATIONS

Office Action for Taiwan Application No. 106141544 dated Feb. 25, 2019; 22pp.
Office Action for Japanese Application No. 2017-009443 dated Oct. 8, 2019; 10pp.
Extended European Search Report for European Application No. 17893298.4 dated Apr. 20, 2020; 14pp.

* cited by examiner (FIRST REPLACEMENT POSITION)

(SECOND REPLACEMENT POSITION)

(SECOND REPLACEMENT POSITION)

(FIRST REPLACEMENT POSITION)

(SECOND REPLACEMENT POSITION)

CORRUGATING ROLL UNIT CONVEYANCE APPARATUS AND APPARATUS AND METHOD FOR REPLACING CORRUGATING ROLL UNIT

RELATED APPLICATIONS

The present application is a National Phase of International Application Number PCT/JP2017/037595 filed Oct. 17, 2017 and claims priority to Japanese Application Number 2017-009443 filed Jan. 23, 2017.

TECHNICAL FIELD

The present invention relates to a corrugating roll unit conveyance apparatus and apparatus and method for replacing the corrugating roll unit, which are used to replace a corrugating roll unit composed of upper and lower corrugating rolls which form a medium by corrugating medium paper, in a single facer for manufacturing a single-faced cardboard sheet by bonding a liner to a corrugated medium.

BACKGROUND ART

A corrugating machine as a cardboard sheet-manufacturing apparatus includes a single facer which forms a single-faced cardboard sheet and a double facer which forms a double-faced cardboard sheet by bonding bottom liner paper to the single-faced cardboard sheet. In the single facer, medium paper (a medium) is processed into a corrugated shape, a top liner is bonded to the corrugated medium paper to form the single-faced cardboard sheet, and in the double facer, a bottom liner is bonded to the single-faced cardboard sheet to form the double-faced cardboard sheet. The continuous double-faced cardboard sheet manufactured by the double facer is cut to a predetermined width by a slitter scorer and cut to a predetermined length by a cutoff device, so that cardboard sheets are formed.

In the single facer of the corrugating machine, the top liner heated by a preheater is transferred to a nip portion between a pressurizing belt and the upper corrugating roll, and on the other hand, the medium paper heated by a preheater is processed into a corrugated shape at a meshing portion between the upper corrugating roll and the lower corrugating roll, whereby a medium is formed, and after an adhesive is applied to a top portion of each corrugation of the medium, the medium is transferred to the nip portion. Then, at the nip portion, the medium is bonded to the top liner, whereby the single-faced cardboard sheet is formed.

In the single facer, in order to manufacture a plurality of types of mediums having different waveform shapes, a plurality of types of upper and lower corrugating rolls are set according to the types of mediums to be manufactured and made to be able to be replaced with respect to the single facer. As an apparatus for replacing a corrugating roll unit, there are apparatuses disclosed in the following patent literatures. In the apparatus for replacing a corrugating roll unit disclosed in PTL 1, a corrugating roll unit is loaded on a carriage and conveyed, and the corrugating roll unit is replaced at a predetermined position. Further, in the apparatus for replacing a corrugating roll unit disclosed in PTL 2, a pair of guide rails is laid adjacent to a single facer, a carriage on which a corrugating roll unit is mounted is moved to a predetermined position by the pair of guide rails, and the corrugated roll unit is replaced.

CITATION LIST

Patent Literature

[PTL 1] Japanese Unexamined Patent Application Publication No. 2009-196331
[PTL 2] U.S. Pat. No. 7,617,856

SUMMARY OF INVENTION

Technical Problem

In the apparatus for replacing a corrugating roll unit disclosed in PTL 1, an empty carriage is moved to a predetermined position, a corrugating roll unit is removed from the single facer, loaded on the carriage, and recovered, and thereafter, a carriage on which a corrugating roll unit to be replaced is loaded is moved to a predetermined position, the corrugating roll unit is mounted to the single facer, and the carriage is recovered. This replacement work is performed by a worker, it is necessary to frequently move the carriage to a predetermined position, and thus a replacement work time becomes long and the burden on workability is also large. Further, in the apparatus for replacing a corrugating roll unit disclosed in PTL 2, the guide rails laid on a floor surface adjacent to the single facer become permanently installed members, and in a case where the guide rails are installed on the operation side of the corrugating machine, the guide rails interfere with a work line in a worker. For example, at the time of paper splicing work by a splicer, the time of maintenance work of the single facer, or the like, the guide rails interfere with the movement of the worker, thereby interfering with various types of quick work by the worker. Further, in most cases, the guide rails cannot be installed on the driving side of the corrugating machine due to limitations of space of a building.

The present invention is for solving the problem described above and has an object to provide a corrugating roll unit conveyance apparatus and apparatus and method for replacing a corrugating roll unit, in which improvement in the workability of replacement work of the corrugating roll unit is achieved without disturbing various types of work by a worker.

Solution to Problem

A corrugating roll unit conveyance apparatus for achieving the above object includes a mounting base having a first accommodation part for accommodating a corrugating roll unit to be removed and a second accommodation part for accommodating a corrugating roll unit to be mounted, and a movement device which moves the mounting base to a first replacement position where the first accommodation part faces an existing corrugating roll unit, a second replacement position where the second accommodation part faces a space where the existing corrugating roll unit has been removed, and a retracted position separated from the first replacement position and the second replacement position.

Therefore, first, if the mounting base is moved from the retracted position to the first replacement position by the movement device, the first accommodation part faces the existing corrugating roll unit. Here, the existing corrugating roll unit is moved to the first accommodation part. Next, the mounting base is moved from the first replacement position to the second replacement position where the second accommodation part faces the space where the existing corrugating roll unit has been removed, by the movement device. Here, the corrugating roll unit in the second accommodation part is moved to the space where the existing corrugating roll unit has been removed. Then, the mounting base is moved from the second replacement position to the retracted position by the movement device, whereby the replacement work is completed. As a result, it is possible to perform the replacement work of the corrugating roll unit with the movement of one carriage, and thus it is possible to improve the workability of the replacement work of the corrugating roll unit without disturbing various types of work by the worker.

In the corrugating roll unit conveyance apparatus according to the present invention, the movement device includes a first traveling device which allows the mounting base to travel along a first horizontal direction which is a mounting direction and a removal direction of the corrugating roll unit, a second traveling device which allows the mounting base to travel along a second horizontal direction orthogonal to the first horizontal direction, and a switching device which switches the first traveling device and the second traveling device so as to be selectively used.

Therefore, if the first traveling device is selected by the switching device and the first traveling device is operated, it is possible to allow the mounting base to travel along the first horizontal direction, and if the second traveling device is selected by the switching device and the second traveling device is operated, it is possible to allow the mounting base to travel along the second horizontal direction. For this reason, it is possible to smoothly move the mounting base to the first replacement position and the second replacement position.

In the corrugating roll unit conveyance apparatus according to the present invention, the switching device is a lifting device which lifts and lowers first traveling wheels of the first traveling device or second traveling wheels of the second traveling device.

Therefore, the first traveling wheels of the first traveling device or the second traveling wheels of the second traveling device are lifted and lowered by the lifting device, whereby the use of the first traveling device and the second traveling device can be switched, and thus it is possible to simplify a structure.

In the corrugating roll unit conveyance apparatus according to the present invention, the movement device includes a first movement device which lifts and lowers the mounting base, and a second movement device which moves the mounting base along a second horizontal direction orthogonal to a first horizontal direction which is a removal direction and a mounting direction of the corrugating roll unit.

Therefore, if the first movement device is operated, it is possible to lift and lower the mounting base, and if the second movement device is operated, it is possible to allow the mounting base to travel along the second horizontal direction. For this reason, it is possible to smoothly move the mounting base to the first replacement position and the second replacement position.

In the corrugating roll unit conveyance apparatus according to the present invention, the mounting base is provided with a guide member for moving the corrugating roll unit along a removal direction and a mounting direction in the first accommodation part and the second accommodation part.

Therefore, since the guide members are provided in the first accommodation part and the second accommodation part of the mounting base, the corrugating roll unit can be moved in the removal direction by the guide member and easily accommodated in the first accommodation part, and the corrugating roll unit in the second accommodation part can be moved in the mounting direction by the guide member and easily mounted at a predetermined position.

Further, an apparatus for replacing a corrugating roll unit according to the present invention includes the corrugating roll unit conveyance apparatus, and a unit replacement mechanism which performs removal and mounting of the corrugating roll unit between a single facer and the corrugating roll unit conveyance apparatus.

Therefore, first, if the mounting base is moved from the retracted position to the first replacement position by the movement device, the first accommodation part faces the existing corrugating roll unit. Here, the existing corrugating roll unit is moved to the first accommodation part by the unit replacement mechanism. Next, the mounting base is moved from the first replacement position to the second replacement position where the second accommodation part faces the space where the existing corrugating roll unit has been removed, by the movement device. Here, the corrugating roll unit in the second accommodation part is moved to the space where the existing corrugating roll unit has been removed, by the unit replacement mechanism. Then, the mounting base is moved from the second replacement position to the retracted position by the movement device, whereby the replacement work is completed. As a result, it is possible to perform the replacement work of the corrugating roll unit with the movement of one carriage, and thus it is possible to improve the workability of the replacement work of the corrugating roll unit without disturbing various types of work by the worker.

In the apparatus for replacing a corrugating roll unit according to the present invention, the single facer includes upper and lower corrugating rolls which nip medium paper and perform corrugating on the medium paper, an endless pressurizing belt which is wound around a plurality of support rolls and pressurizes and joins the corrugated medium paper and a liner along with one of the upper and lower corrugating rolls, and a belt support mechanism which prevents lowering of the pressurizing belt at the time of replacement of the upper and lower corrugating rolls.

Therefore, since lowering of the pressurizing belt is blocked by the belt support mechanism at the time of the replacement of the upper and lower corrugating rolls, the upper corrugating roll does not come into contact with the pressurizing belt, and thus damage to the pressurizing belt can be prevented. As a result, it is possible to improve the workability of the replacement work of the corrugating roll unit.

In the apparatus for replacing a corrugating roll unit according to the present invention, the belt support mechanism includes a support member for supporting the pressurizing belt between the plurality of support rolls.

Therefore, since the pressurizing belt between the plurality of support rolls is supported by the support member at the time of the replacement of the upper and lower corrugating rolls, it is possible to easily prevent the contact between the upper corrugating roll and the pressurizing belt with a simple configuration.

In the apparatus for replacing a corrugating roll unit according to the present invention, the belt support mechanism includes a support member moving device which moves the support member to a retracted position where the support member is separated from the pressurizing belt by a predetermined distance and a support position where the support member supports the pressurizing belt.

Therefore, the support member is normally located at the retracted position where the support member is separated from the pressurizing belt, so that the operation of the single facer is not hindered. Then, at the time of the replacement of the upper and lower corrugating rolls, the support member is moved to the support position where the support member supports the pressurizing belt, by the support member moving device, and therefore, the support member easily supports the pressurizing belt with a simple configuration, whereby it is possible to prevent the contact between the upper corrugating roll and the pressurizing belt.

In the apparatus for replacing a corrugating roll unit according to the present invention, the support member is a support rod for supporting the pressurizing belt between the plurality of support rolls from below in a vertical direction, and the support member moving device is capable of moving the support rod.

Therefore, at the time of the replacement of the upper and lower corrugating rolls, the support rod is moved to the support position by the support member moving device and supports the pressurizing belt from below, and therefore, it is possible to prevent the contact between the upper corrugating roll and the pressurizing belt by easily supporting the pressurizing belt with a simple configuration.

In the apparatus for replacing a corrugating roll unit according to the present invention, the support member is a suction member which suctions the pressurizing belt between the plurality of support rolls from above in a vertical direction, and the support member moving device is capable of lifting and lowering the suction member.

Therefore, at the time of the replacement of the upper and lower corrugating rolls, the pressurizing belt is suctioned from above by the suction member, and therefore, it is possible to prevent the contact between the upper corrugating roll and the pressurizing belt by easily supporting the pressurizing belt with a simple configuration.

In the apparatus for replacing a corrugating roll unit according to the present invention, the belt support mechanism is an adjustment device which adjusts a distance between the plurality of support rolls.

Therefore, at the time of the replacement of the upper and lower corrugating rolls, the distance between the plurality of support rolls is adjusted by the adjustment device, and therefore, it is possible to prevent the contact between the upper corrugating roll and the pressurizing belt by easily supporting the pressurizing belt with an existing device.

Further, an apparatus for replacing a corrugating roll unit according to the present invention includes the corrugating roll unit conveyance apparatus, a stopper which blocks a movement of the mounting base when the mounting base is moved along the mounting direction of the corrugating roll unit by the first traveling device, and a unit replacement mechanism which performs removal and mounting of the corrugating roll unit between a single facer and the corrugating roll unit conveyance apparatus.

Therefore, first, if the first traveling device is operated to allow the mounting base to travel along the first horizontal direction, the mounting base comes into contact with the stopper, whereby the movement thereof is blocked, and next, the second traveling device is operated to allow the mounting base to travel along the second horizontal direction, thereby moving the mounting base to the first replacement position or the second replacement position. Then, at the first replacement position, the existing corrugating roll unit is moved to the first accommodation part by the unit replacement mechanism. Further, at the second replacement position, the corrugating roll unit in the second accommodation part is moved to the space where the existing corrugating roll unit has been removed, by the unit replacement mechanism. Then, the mounting base is moved from the second replacement position to the retracted position by the movement device, whereby the replacement work is completed. As a result, it is possible to perform the replacement work of the corrugating roll unit with the movement of one carriage, and thus it is possible to improve the workability of the replacement work of the corrugating roll unit without disturbing various types of work by the worker.

The apparatus for replacing a corrugating roll unit according to the present invention further includes a minute movement mechanism which moves the mounting base in a direction opposite to the mounting direction of the corrugating roll unit by a minute distance set in advance, from a contact position with the stopper.

Therefore, when the mounting base has come into contact with the stopper, the mounting base is moved in the opposite direction by the minute distance from the contact position by the minute movement mechanism, and therefore, it is possible to allow the mounting base to travel in the second horizontal direction in a state of being separated from the stopper, and thus it is possible to allow the mounting base to smoothly travel.

In the apparatus for replacing a corrugating roll unit according to the present invention, the lifting device is capable of lifting and lowering the second traveling wheels, and the minute movement mechanism has first inclined surfaces having a convex shape and formed on one of each of the second traveling wheels and a floor surface, and second inclined surfaces having a concave shape and formed on the other of each of the second traveling wheels and the floor surface.

Therefore, when the mounting base has come into contact with the stopper, if the lifting device lowers the second traveling wheels, the second traveling wheels are grounded to the floor surface, and at this time, since the first inclined surfaces and the second inclined surfaces come into contact with each other and the mounting base moves in the opposite direction by the minute distance from the contact position with the stopper, it is possible to allow the mounting base to travel in the second horizontal direction in a state of being separated from the stopper, and thus it is possible to allow the mounting base to smoothly travel.

Further, a method of replacing a corrugating roll unit according to the present invention includes a step of moving an existing corrugating roll unit to the first accommodation part at the first replacement position, a step of moving the mounting base to a second replacement position where the second accommodation part faces a space where the existing corrugating roll unit has been removed, a step of moving a corrugating roll unit of the second accommodation part to the space at the second replacement position, and a step of retracting the mounting base from the second replacement position.

Therefore, it is possible to perform the replacement work of the corrugating roll unit with the movement of one carriage, and thus it is possible to improve the workability of the replacement work of the corrugating roll unit without disturbing various types of work by the worker.

Advantageous Effects of Invention

According to the corrugating roll unit conveyance apparatus and the apparatus and method for replacing corrugating roll unit according to the present invention, it is possible to perform the replacement work of the corrugating roll unit with the movement of one carriage, and thus it is possible to improve the workability of the replacement work of the corrugating roll unit without disturbing various types of work by the worker.

DESCRIPTION OF EMBODIMENTS

Hereinafter, preferred embodiments of a corrugating roll unit conveyance apparatus and apparatus and method for replacing a corrugating roll unit according to the present invention will be described in detail with reference to the accompanying drawings. The present invention is not limited by these embodiments, and in a case where there are a plurality of embodiments, the present invention also includes configurations made by combining the respective embodiments.

First Embodiment

Figure 1:
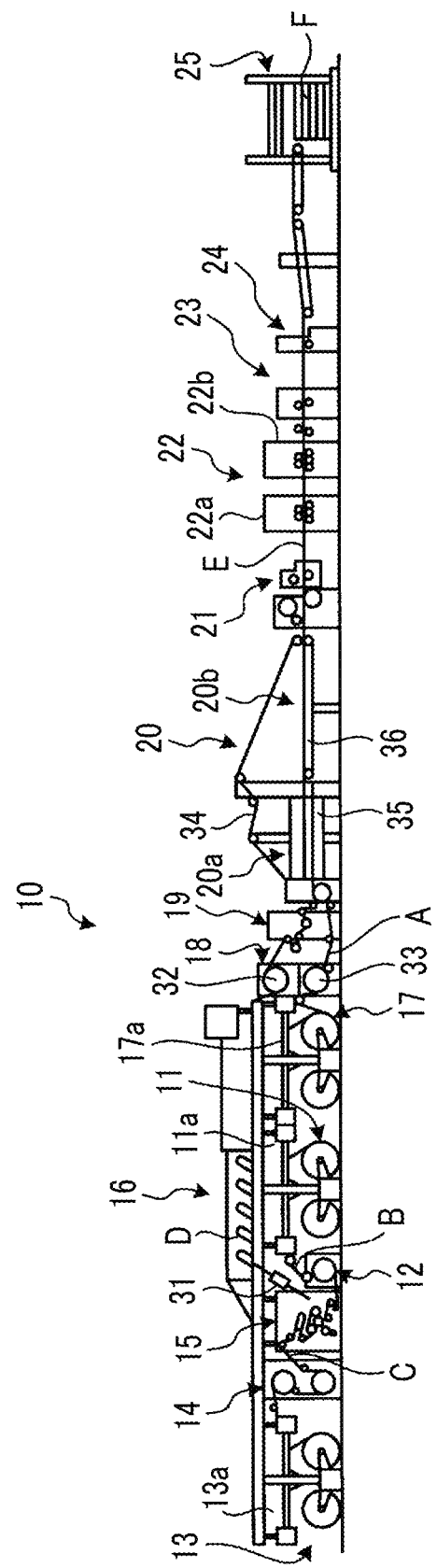
FIG. 1 is a schematic diagram showing a corrugating machine as a cardboard sheet-manufacturing apparatus.

FIG. 1 is a schematic diagram showing a corrugating machine as a cardboard sheet-manufacturing apparatus.

As shown in FIG. 1, a corrugating machine 10 as a cardboard sheet-manufacturing apparatus is for manufacturing a single-faced cardboard sheet D by bonding, for example, a top liner C as a second liner to a corrugated medium (medium paper) B, and manufacturing a sheet-like double-faced cardboard sheet F by bonding, for example, a bottom liner A as a first liner to the medium B side of the manufactured single-faced cardboard sheet D, thereby forming a double-faced cardboard sheet E, and cutting the continuous double-faced cardboard sheet E to a predetermined length.

The corrugating machine 10 includes a mill roll stand 11 for the medium B, a preheater (preheating device) 12, a mill roll stand 13 for the top liner C, a preheater (preheating device) 14, a single facer 15, a bridge 16, a mill roll stand 17 for the bottom liner A, a preheater (preheating device) 18, a glue machine 19, a double facer 20, a rotary shear 21, a slitter scorer 22, a cutoff 23, a defective sheet rejecting device 24, and a stacker 25.

In the mill roll stand 11, rolls of paper, in each of which the medium paper from which the mediums B is formed is wound in a roll shape, are respectively mounted on both sides, and a splicer (a paper splicing device) 11a which performs paper splicing is provided on the upper side thereof. In a case where paper is being fed from the roll of paper on one side, the roll of paper on the other side is mounted and paper splicing is prepared. If the remaining of the base paper of the roll of paper on one side is a small amount, the splicer 11a performs paper splicing of the base paper of the roll of paper on the other side. Then, while the base paper is being supplied from the roll of paper on the other side, the roll of paper on one side is mounted and paper splicing is prepared. In this way, the base paper is sequentially spliced and continuously fed toward the downstream side from the mill roll stand 11.

On the other hand, in the mill roll stand 13, rolls of paper, in each of which the top liner C is wound in a roll shape, are respectively mounted on both sides, and a splicer 13a which performs paper splicing is provided on the upper side thereof. In a case where paper is being fed from the roll of paper on one side, the roll of paper on the other side is mounted and paper splicing is prepared. If the remaining of the base paper of the roll of paper on one side is a small amount, the splicer 13a performs paper splicing of the base paper of the roll of paper on the other side. Then, while the base paper is being supplied from the roll of paper on the other side, the roll of paper on one side is mounted and paper splicing is prepared. In this way, the base paper is sequentially spliced and continuously fed toward the downstream side from the mill roll stand 13.

The preheaters 12 and 14 are for preheating the medium B and the top liner C, respectively. The preheaters 12 and 14 each have a heating device in which steam is supplied to the interior thereof, and convey the base paper (the medium B and the top liner C) which is continuously fed from the mill roll stands 11 and 13 while heating the base paper by the heating device, thereby heating the medium B and the top liner C to a predetermined temperature.

The single facer 15 forms the single-faced cardboard sheet D by processing the medium B heated by the preheater 12 in a corrugated shape, then applying an adhesive to a top portion of each corrugation, and bonding the top liner C heated by the preheater 14 to the corrugated medium B. In the single facer 15, a pickup conveyor 31 is provided obliquely upward on the downstream side in a transfer direction. The pickup conveyor 31 is composed of a pair of endless belts and has a function of nipping the single-faced cardboard sheet D formed in the single facer 15 and conveying it to the bridge 16. The bridge 16 functions as a retaining part for temporarily retaining the single-faced cardboard sheet D in order to absorb a difference in speed between the single facer 15 and the double facer 20.

In the mill roll stand 17, rolls of paper, in each of which the bottom liner A is wound in a roll shape, are respectively mounted on both sides, and a splicer 17a which performs paper splicing is provided on the upper side thereof. In a case where paper is being fed from the roll of paper on one side, the roll of paper on the other side is mounted and paper splicing is prepared. If the remaining of the base paper of the roll of paper on one side is a small amount, the splicer 17a performs paper splicing of the base paper of the roll of paper on the other side. Then, while the base paper is being supplied from the roll of paper on the other side, the roll of paper on one side is mounted and paper splicing is prepared. In this way, the base paper is sequentially spliced and continuously fed toward the downstream side from the mill roll stand 17.

The preheater 18 has a heating roll (hereinafter, a single-faced sheet heating roll) 32 for the single-faced cardboard sheet D and a heating roll (hereinafter, a bottom liner heating roll) 33 for the bottom liner A. The single-faced sheet heating roll 32 has a winding amount adjusting device, is heated to a predetermined temperature by steam which is supplied to the interior thereof, and can preheat the single-faced cardboard sheet D by winding the top liner C side of the single-faced cardboard sheet D around the circumferential surface thereof. On the other hand, the bottom liner heating roll 33 also likewise has a winding amount adjusting device, is heated to a predetermined temperature by steam which is supplied to the interior thereof, and can preheat the bottom liner A by winding the bottom liner A around the circumferential surface thereof.

The glue machine 19 has adhesive equipment and a pressurizing device. The single-faced cardboard sheet D heated by the single-faced sheet heating roll 32 is guided along the inside of the glue machine 19 on the way, and when the single-faced cardboard sheet D passes between a rider roll and an adhesive applicator roll, an adhesive is applied to a top portion of each of the corrugations of the medium B.

The single-faced cardboard sheet D with an adhesive applied thereto by the glue machine 19 is transferred to the double facer 20 of the next process. Further, the bottom liner A heated by the bottom liner heating roll 33 is also transferred to the double facer 20 through the glue machine 19.

The double facer 20 is divided into a heating section 20a on the upstream side and a cooling section 20b on the downstream side along a traveling line of the single-faced cardboard sheet D and the bottom liner A. The single-faced cardboard sheet D with an adhesive applied thereto by the glue machine 19 is carried in between a pressurizing belt 34 and a hot plate 35 in the heating section 20a, and the bottom liner A is carried in between the pressurizing belt 34 and the hot plate 35 so as to overlap the medium B side of the single-faced cardboard sheet D. Then, the single-faced cardboard sheet D and the bottom liner A are carried in between the pressurizing belt 34 and the hot plate 35, and then transferred toward the cooling section 20b in an integrated manner in a state of being overlapped up and down. During this transfer, the single-faced cardboard sheet D and the bottom liner A are heated while being pressurized, whereby they are bonded to each other to form the continuous double-faced cardboard sheet E. The double-faced cardboard sheet E is naturally cooled in the cooling section 20b when being nipped and conveyed by the pressurizing belt 34 and a conveyance belt 36.

The double-faced cardboard sheet E manufactured in the double facer 20 is transferred to the rotary shear 21. The rotary shear 21 is for cutting the entire width of the double-faced cardboard sheet E in the width direction or partially cutting the double-faced cardboard sheet E before the bonding is stabilized in an operation initial stage. The slitter scorer 22 is for cutting the wide double-faced cardboard sheet E along the transfer direction so as to have a predetermined width, and forming creasing lines extending in the transfer direction. The slitter scorer 22 is composed of a first slitter scorer unit 22a and a second slitter scorer unit 22b having substantially the same structure, which are arranged along the transfer direction of the double-faced cardboard sheet E. Each of the first slitter scorer unit 22a and the second slitter scorer unit 22b has a plurality of sets of upper creasing line rolls and lower creasing line rolls, which are disposed to face each other with the double-sided cardboard sheet E interposed therebetween, in the width direction, and has a plurality of sets of slitter knives, which are disposed on the lower side of the double-sided cardboard sheet E, in the width direction.

The cutoff 23 is for cutting the double-faced cardboard sheet E cut in the transfer direction by the slitter scorer 22 along the width direction to form a plate-shaped double-faced cardboard sheet F having a predetermined length. The defective sheet rejecting device 24 is for rejecting the double-faced cardboard sheet F determined to be a defective sheet by a defect detection device (described later) from a conveyance line. The stacker 25 is for stacking the non-defective double-faced cardboard sheets F and discharging them as products to the outside of the machine.

Figure 2:
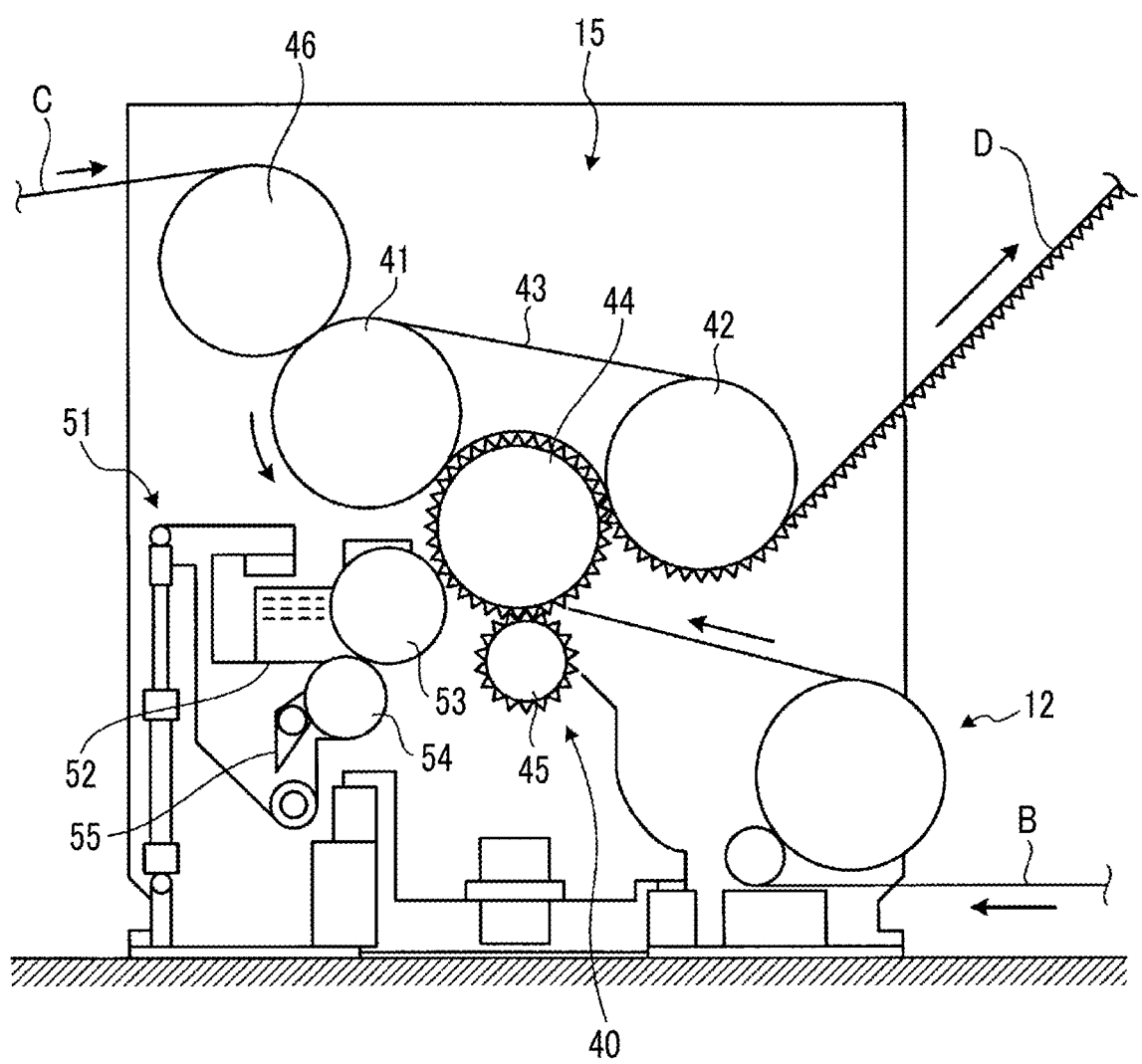
FIG. 2 is a schematic configuration diagram showing a single facer.

Here, the single facer 15 will be described in detail. FIG. 2 is a schematic configuration diagram showing the single facer.

As shown in FIG. 2, the single facer 15 includes a belt roll (a support roll) 41, a tension roll (a support roll) 42, a pressurizing belt 43 wound around the belt roll 41 and the tension roll 42, an upper corrugating roll 44 having a surface formed in a corrugated shape and being in contact with the pressurizing belt 43 in a pressurized state, and a lower corrugating roll 45 having a surface likewise formed in a corrugated shape and engaged with the upper corrugating roll 44.

The top liner C heated by the preheater 14 (refer to FIG. 1) is preheated by being wound around a liner preheating roll 46, and then transferred to a nip portion between the pressurizing belt 43 and the upper corrugating roll 44 together with the pressurizing belt 43 which is guided by the belt roll 41. On the other hand, the medium B heated by the preheater 12 is processed into a corrugated shape at a meshing portion between the upper corrugating roll 44 and the lower corrugating roll 45 and then transferred to the nip portion between the pressurizing belt 43 and the upper corrugating roll 44 while being guided by the upper corrugating roll 44.

Adhesive equipment 51 is disposed in the vicinity of the upper corrugating roll 44. The adhesive equipment 51 is composed of an adhesive dam 52 in which an adhesive is stored, an adhesive applicator roll 53 which applies the adhesive to the medium B which is conveyed by the upper corrugating roll 44, a meter roll 54 for adjusting the amount of the adhesive which is stuck to the circumferential surface of the adhesive applicator roll 53, and an adhesive scraping blade 55 for scraping the adhesive from the meter roll 54. The medium B corrugated at the meshing portion between the upper corrugating roll 44 and the lower corrugating roll 45 is applied with the adhesive at the top portion of each corrugation by the adhesive applicator roll 53 and then bonded to the top liner C at the nip portion between the pressurizing belt 43 and the upper corrugating roll 44, whereby the single-faced cardboard sheet D is formed.

All the belt roll 41, the tension roll 42, the upper corrugating roll 44, and the lower corrugating roll 45 are heated by steam which flows in the interior thereof. For this reason, the medium B is heated when it is processed into a corrugated shape by being pressurized at the meshing portion between the upper corrugating roll 44 and the lower corrugating roll 45. Then, the medium B is applied with the adhesive at the top portion of each corrugation by the adhesive applicator roll 53 and then pressurized and heated when being overlapped with the top liner C, by the pressurizing belt 43 and the upper corrugating roll 44. The adhesive receives a predetermined amount of heat, so that the adhesive force thereof increases, and thus the adhesive is solidified, and the medium B and the top liner C are bonded to each other due to the adhesive being solidified by receiving heat from the upper and lower corrugating rolls 44 and 45 and the pressurizing belt 43.

Further, although not shown in the drawings, a pressurizing force adjusting device capable of adjusting a pressurizing force to the medium B and the top liner C by the upper corrugating roll 44 and the pressurizing belt 43 is provided. The pressurizing force adjusting device has a hydraulic cylinder, and a tip portion of a drive rod thereof is connected to a support shaft of the tension roll 42. Therefore, the tension of the pressurizing belt 43 is adjusted by moving the tension roll 42 toward and away from the belt roll 41 by the hydraulic cylinder, and thus the pressurizing force to the medium B and the top liner C which are conveyed between the upper corrugating roll 44 and the pressurizing belt 43 can be adjusted.

In the single facer 15 configured in this manner, it is necessary to form a plurality of types of mediums B having different waveform shapes, and therefore, a plurality of types of upper and lower corrugating rolls 44 and 45 are provided according to the types of the mediums B to be formed, and a corrugating roll unit composed of the upper corrugating roll 44, the lower corrugating roll 45, and the like is made to be able to be replaced with respect to the single facer 15. A corrugating roll unit 40 is composed of the upper corrugating roll 44, the lower corrugating roll 45, the adhesive equipment 51, and the like.

Hereinafter, a corrugating roll unit replacement carriage (a corrugating roll unit conveyance apparatus), a support device of the pressurizing belt for the corrugating roll unit, and apparatus and method for replacing a corrugating roll unit of the first embodiment will be described.

Figure 3:
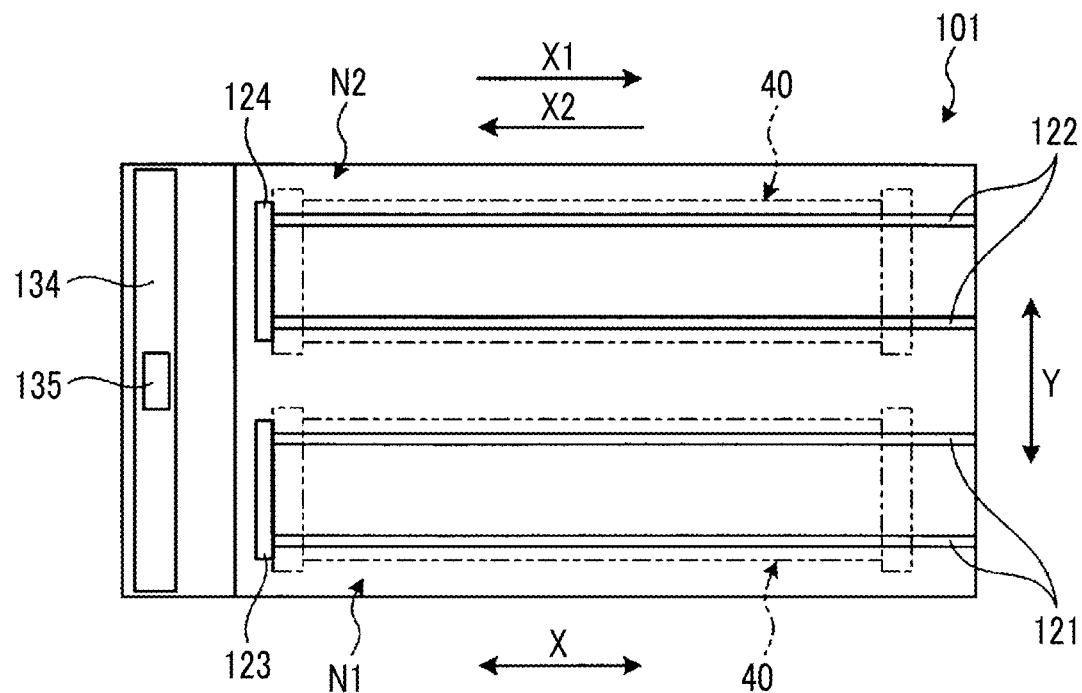
FIG. 3 is a plan view showing a corrugating roll unit replacement carriage of a first embodiment.
Figure 4:
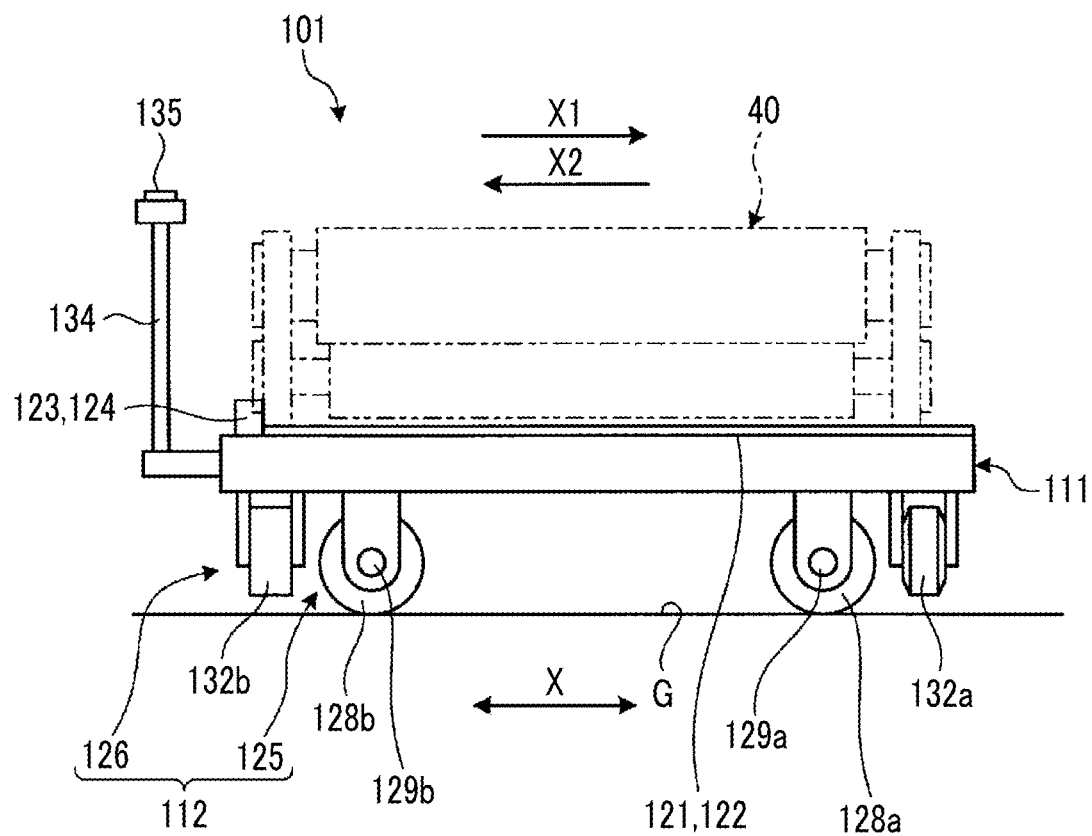
FIG. 4 is a side view showing the corrugating roll unit replacement carriage.
Figure 5:
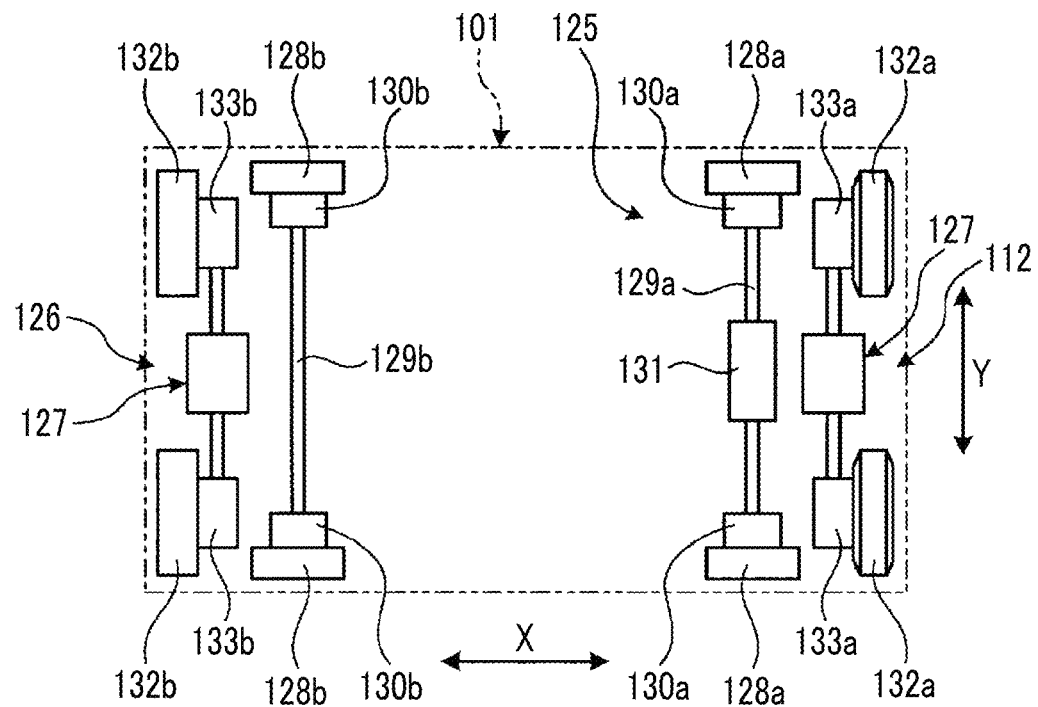
FIG. 5 is a schematic diagram showing a traveling device in the corrugating roll unit replacement carriage.
Figure 6A:
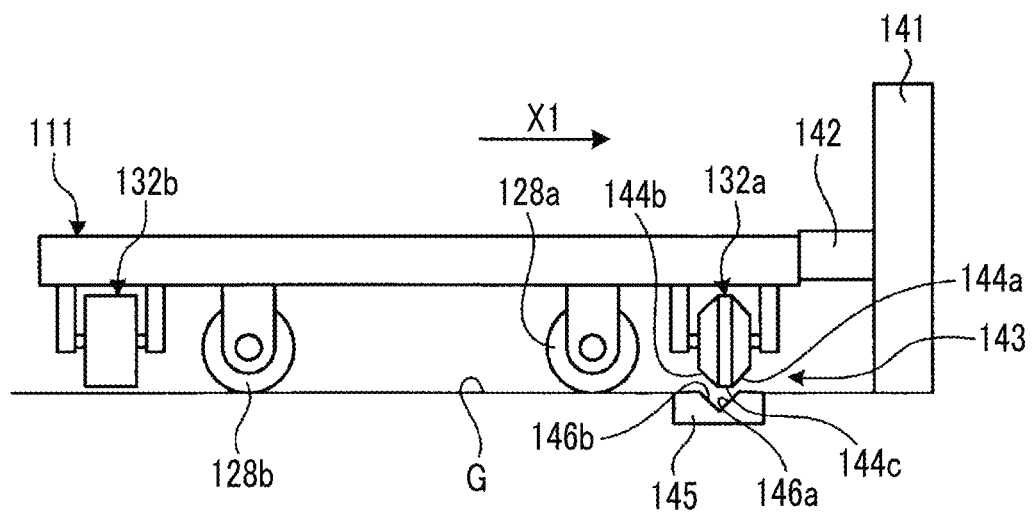
FIG. 6A is a side view showing an operation of the corrugating roll unit replacement carriage.
Figure 6B:
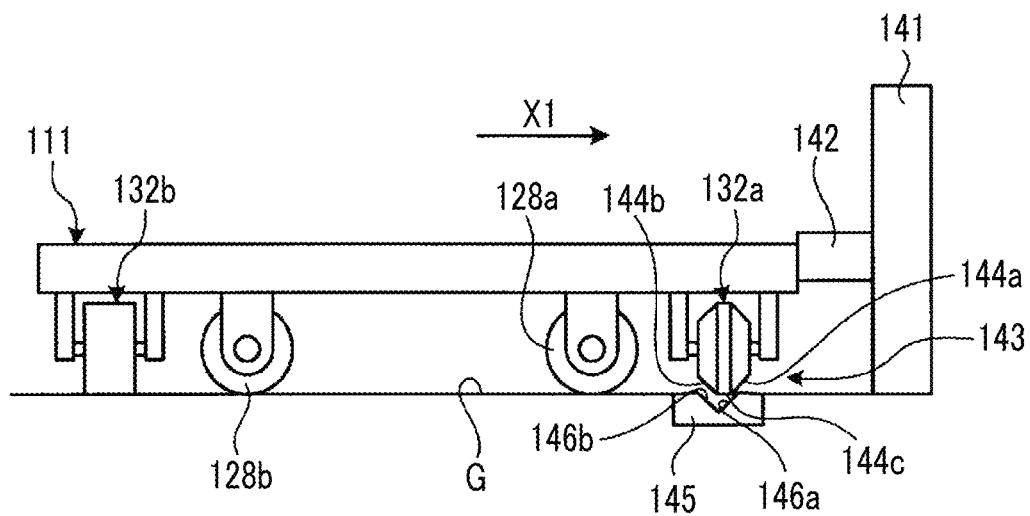
FIG. 6B is a side view showing the operation of the corrugating roll unit replacement carriage.
Figure 6C:
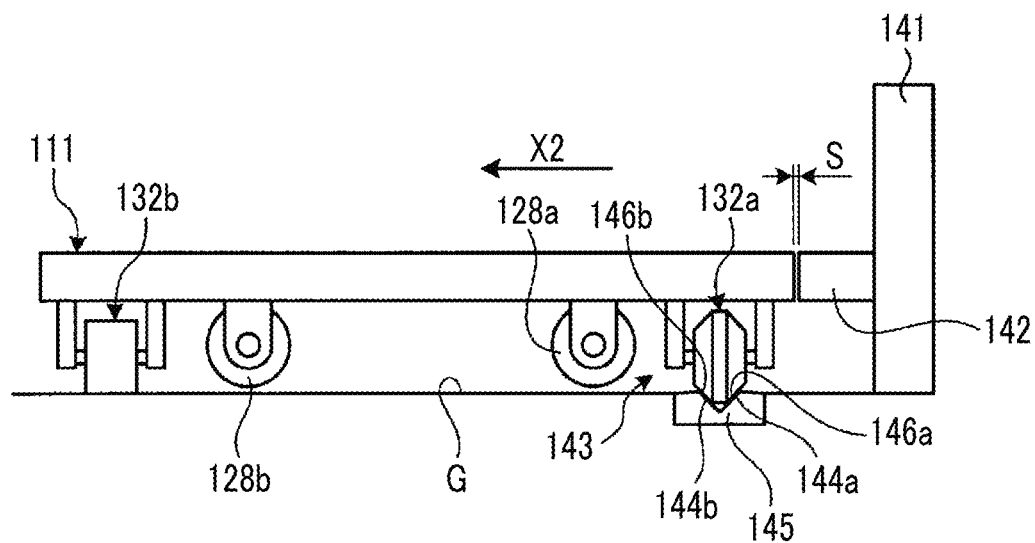
FIG. 6C is a side view showing the operation of the corrugating roll unit replacement carriage.

FIG. 3 is a plan view showing the corrugating roll unit replacement carriage of the first embodiment, FIG. 4 is a side view showing the corrugating roll unit replacement carriage, FIG. 5 is a schematic diagram showing a traveling device in the corrugating roll unit replacement carriage of the first embodiment, and FIGS. 6A to 6C are side views showing an operation of the corrugating roll unit replacement carriage. Further, FIG. 15 is a plan view showing the apparatus for replacing a corrugating roll unit of the first embodiment.

Figure 15:
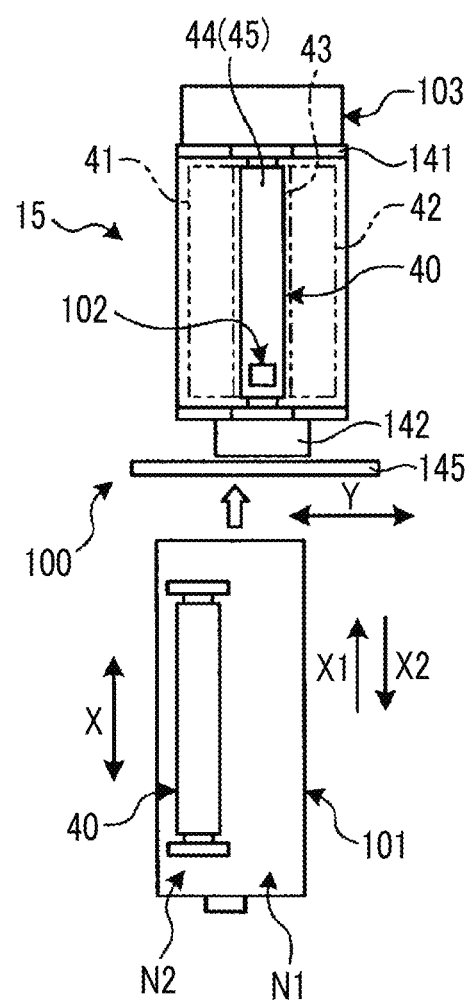
FIG. 15 is a plan view showing an apparatus for replacing a corrugating roll unit of the first embodiment.

In the first embodiment, as shown in FIG. 15, an apparatus for replacing a corrugating roll unit 100 includes a corrugating roll unit replacement carriage 101, a support device 102 of the pressurizing belt for the corrugating roll unit, and a unit replacement mechanism 103. Here, a first horizontal direction which is a removal direction and a mounting direction of the corrugating roll unit 40 is set as being an X direction, and a second horizontal direction orthogonal to the first horizontal direction X is set as being a Y direction. Further, the mounting direction of the corrugating roll unit 40 is a direction X1 in which the corrugating roll unit replacement carriage 101 approaches the single facer 15 along the first horizontal direction X, and the removal direction of the corrugating roll unit 40 is a direction X2 in which the corrugating roll unit replacement carriage 101 is separated from the single facer 15 along the first horizontal direction X.

First, the corrugating roll unit replacement carriage 101 will be described. As shown in FIGS. 3 to 5, the corrugating roll unit replacement carriage 101 of the first embodiment includes a mounting base 111 and a movement device 112.

The mounting base 111 has a rectangular plate shape and has a first accommodation part N1 for accommodating the corrugating roll unit 40 to be removed from the single facer 15 and a second accommodation part N2 for accommodating the corrugating roll unit 40 to be mounted to the single facer 15. Then, in the mounting base 111, guide rails (guide members) 121 and 122 which support the corrugating roll unit 40 so as to be able to move the corrugating roll unit 40 along the first horizontal direction X in the first accommodation part N1 and the second accommodation part N2, respectively, are provided at an upper surface portion thereof. Further, the mounting base 111 is provided with contact parts 123 and 124 at the upper surface portion on one end portion side in a longitudinal direction in the guide rails 121 and 122. When the corrugating roll unit 40 moves in the removal direction X2 by the guide rails 121 and 122 of the mounting base 111, the corrugating roll unit 40 is positioned by coming into contact with the contact parts 123 and 124.

The movement device 112 is composed of a first traveling device 125, a second traveling device 126, and a lifting device (switching device) 127. The first traveling device 125 is for traveling the mounting base 111 along the first horizontal direction X, and the second traveling device 126 is for traveling the mounting base 111 along the second horizontal direction Y. In the first traveling device 125, as four first traveling wheels, two front wheels 128a and two rear wheels 128b are provided to be integrally rotatable by axles 129a and 129b, and drive devices 130a and 130b are provided on the axle 129a for the front wheels 128a and the axle 129b for the rear wheels 128b. For this reason, the front wheels 128a and the rear wheels 128b are driven and rotated through the axles 129a and 129b by the drive devices 130a and 130b, whereby the mounting base 111 can travel along the first horizontal direction X on a floor surface G. A steering device 131 may be provided on the axle 129a for the front wheels 128a.

In the second traveling device 126, as four second traveling wheels, two wheels 132a on the front side and two wheels 132b on the rear side are provided, and drive devices 133a and 133b are provided on the wheels 132a and 132b, respectively. For this reason, the mounting base 111 can travel along the second horizontal direction Y on the floor surface G by driving and rotating the wheels 132a and 132b by the drive devices 133a and 133b.

The lifting device 127 is for lifting and lowering the wheels 132a and 132b of the second traveling device 126, thereby switching between the first traveling device 125 and the second traveling device 126 such that the first traveling device 125 and the second traveling device 126 can be selectively used. For this reason, if the wheels 132a and 132b are lifted by the lifting device 127, the front wheels 128a and the rear wheels 128b of the first traveling device 125 are grounded to the floor surface G and the wheels 132a and 132b of the second traveling device 126 are separated from the floor surface G, whereby the first traveling device 125 can be used. On the other hand, if the wheels 132a and 132b are lowered by the lifting device 127, the wheels 132a and 132b of the second traveling device 126 are grounded to the floor surface G and the front wheels 128a and the rear wheels 128b of the first traveling device 125 are separated from the floor surface G, whereby the second traveling device 126 can be used. The first traveling device 125 and the second traveling device 126 may be switched so as to be able to be selectively used by lifting and lowering the front wheels 128a and the rear wheels 128b of the first traveling device 125 by the lifting device 127.

For this reason, the movement device 112 can move the mounting base 111 to a first replacement position (a position shown in FIG. 16 (described later)) where the first accommodation part N1 faces the existing corrugating roll unit 40, a second replacement position (a position shown in FIG. 17 (described later)) where the second accommodation part N2 faces a space where the existing corrugating roll unit 40 has been removed, and a retracted position separated from the first replacement position and the second replacement position, by the first traveling device.

Further, the mounting base 111 is provided with an operating handle 134 at one end portion in the longitudinal direction, and the operating handle 134 is provided with an operating panel 135 for driving and stopping the movement device 112.

Further, as shown in FIG. 6A, in the single facer 15, a stopper 142 for the mounting base 111 is provided at a frame 141. When the mounting base 111 is moved along the mounting direction X1 by the first traveling device 125, the mounting base 111 comes into contact with the stopper 142, so that the movement thereof is blocked. Further, a minute movement mechanism 143 is provided, and when the mounting base 111 has come into contact with the stopper 142, the minute movement mechanism 143 moves the mounting base 111 in the removal direction X2 opposite to the mounting direction X1 by a minute distance S set in advance, from the contact position.

In the minute movement mechanism 143, each of the wheels 132a of the second traveling device 126 has a convex shape and is provided with two first inclined surfaces 144a and 144b inclined in the opposite directions with respect to the horizontal direction and a flat surface 144c along the horizontal direction between the first inclined surfaces 144a and 144b. On the other hand, the floor surface G adjacent to the stopper 142 is provided with a guide rail 145, and the guide rail 145 has a concave shape and is provided with two second inclined surfaces 146a and 146b inclined in the opposite directions with respect to the horizontal direction. Here, the first inclined surfaces 144a and 144b of each of the wheels 132a and the second inclined surfaces 146a and 146b of the guide rail 145 are set to have substantially the same inclination angle. Each of the wheels 132a of the second traveling device 126 may be formed so as to have a concave shape and the guide rail 145 may be formed so as to have a convex shape.

For this reason, as shown in FIG. 6A, in a state where the front wheels 128a and the rear wheels 128b of the first traveling device 125 are grounded to the floor surface G and the wheels 132a and 132b of the second traveling device 126 are separated from the floor surface G, the mounting base 111 is traveled in the mounting direction X1 by the first traveling device 125 and comes into contact with the stopper 142 to stop. At this time, the wheels 132a are located above the guide rail 145. However, the wheels 132a are located at a position shifted to the stopper 142 side by the minute distance S. Here, as shown in FIGS. 6A and 6B, if the wheels 132a and 132b are lowered by the lifting device 127, only the first inclined surface 144a of each of the wheels 132a comes into contact with only the second inclined surface 146a of the guide rail 145. Then, if the wheels 132a and 132b are further lowered by the lifting device 127, as shown in FIGS. 6B and 6C, the first inclined surface 144a of each of the wheels 132a is guided by the second inclined surface 146a of the guide rail 145 to move in the removal direction X2 and the first inclined surfaces 144a and 144b of each of the wheels 132a come into contact with the second inclined surfaces 146a and 146b of the guide rail 145. At this time, the wheels 132b of the second traveling device 126 are also grounded to the floor surface G and the front wheels 128a and the rear wheels 128b of the first traveling device 125 are separated from the floor surface G. Then, the minute distance S is secured between the mounting base 111 and the stopper 142, and thus when the mounting base 111 is moved in the second horizontal direction Y by the second traveling device 126, the mounting base 111 can travel without coming into contact with the stopper 142.

Figure 7:
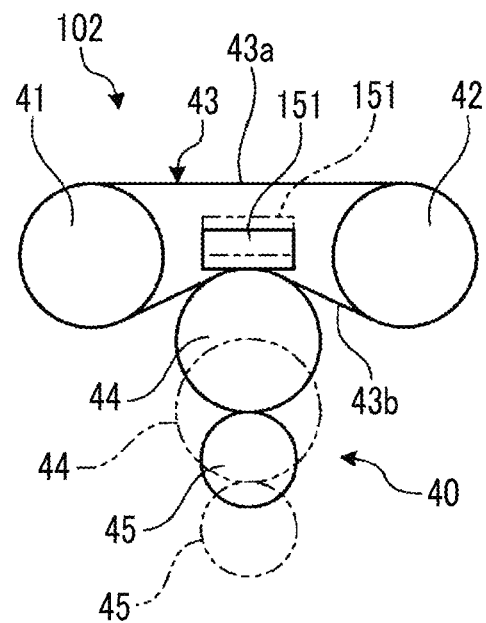
FIG. 7 is a schematic front view showing a support device of a pressurizing belt for a corrugating roll unit of the first embodiment.

Next, the support device of the pressurizing belt for the corrugating roll unit will be described. FIG. 7 is a schematic front view showing the support device of the pressurizing belt for the corrugating roll unit of the first embodiment.

As shown in FIG. 7, the support device 102 of the pressurizing belt for the corrugating roll unit is provided with a belt support mechanism which prevents lowering of the pressurizing belt 43 at the time of the replacement of the corrugating roll unit 40. The belt support mechanism is provided with a support member for supporting an upper belt 43a or a lower belt 43b of the pressurizing belt 43 wound around the belt roll 41 and the tension roll 42. Further, the belt support mechanism is provided with a support member moving device which moves the support member to a retracted position where the support member is separated from the pressurizing belt 43 by a predetermined distance and a support position where the support member supports the pressurizing belt 43. Specifically, the support member is a suction member 151 which suctions the lower belt 43b of the pressurizing belt 43 from above in the vertical direction, and a suction device (not shown) is connected to the suction member 151. Further, the support member moving device is an air cylinder lifting device (not shown) capable of lifting and lowering the suction member 151.

During the operation of the single facer 15, that is, when the pressurizing belt 43 is being moved by the belt roll 41 and the tension roll 42, the pressurizing belt 43 is in contact with the upper corrugating roll 44. At this time, the suction member 151 is located at a retracted position (a position shown by a two-dot chain line in FIG. 7) where the suction member 151 is separated from the pressurizing belt 43, between the upper belt 43*a* and the lower belt 43*b*. Then, when the operation of the single facer 15 is stopped and the corrugating roll unit 40 is replaced, the suction member 151 is lowered to move to a support position (a position shown by a solid line in FIG. 7) where the suction member 151 supports the lower belt 43*b*, and the suction member 151 suctions the lower belt 43*b* by operating the suction device. Here, the existing corrugating roll unit 40 composed of the upper corrugating roll 44, the lower corrugating roll 45, and the like is lowered as shown by a two-dot chain line in FIG. 7, and then moved in the removal direction X2 and removed. Subsequently, another corrugating roll unit 40 is moved in the mounting direction X1 to the space where the existing corrugating roll unit 40 has been removed, and then lifted as shown by the solid line in FIG. 7. At this time, since the lower belt 43*b* is suctioned by the suction member 151, the pressurizing belt 43 does not hang down. For this reason, even if the corrugating roll unit 40 is moved in the removal direction X2 or the mounting direction X1 at the time of the replacement of the corrugating roll unit 40, the corrugating roll unit 40 does not come into contact with the pressurizing belt 43, and thus damage to the pressurizing belt 43 is prevented.

Figure 8:
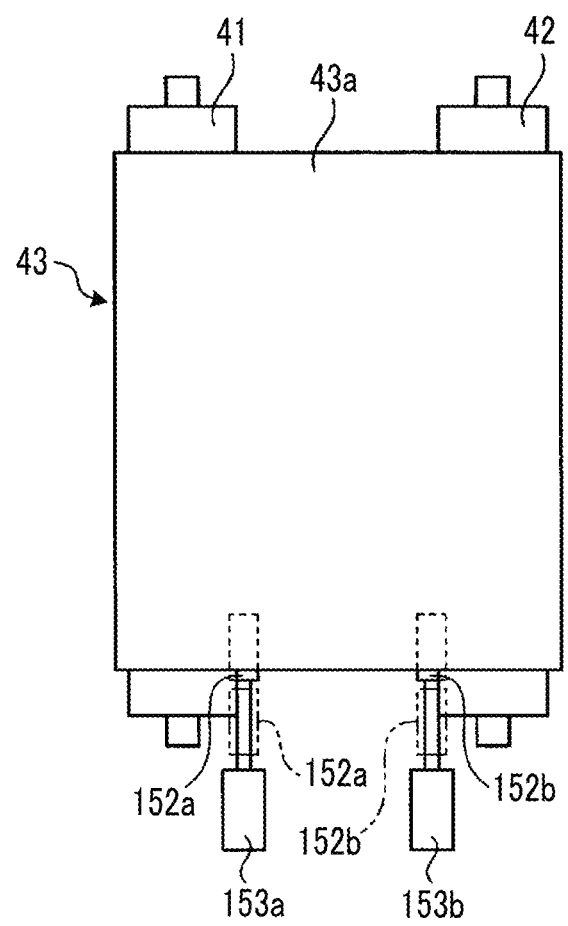
FIG. 8 is a schematic plan view showing a support device of a pressurizing belt for a corrugating roll unit according to a first modification example of the first embodiment.

The support device of the pressurizing belt for the corrugating roll unit is not limited to that described above. FIG. 8 is a schematic plan view showing a support device of the pressurizing belt for the corrugating roll unit according to a first modification example of the first embodiment, and FIG. 9 is a schematic front view showing the support device of the pressurizing belt for the corrugating roll unit.

Figure 9:
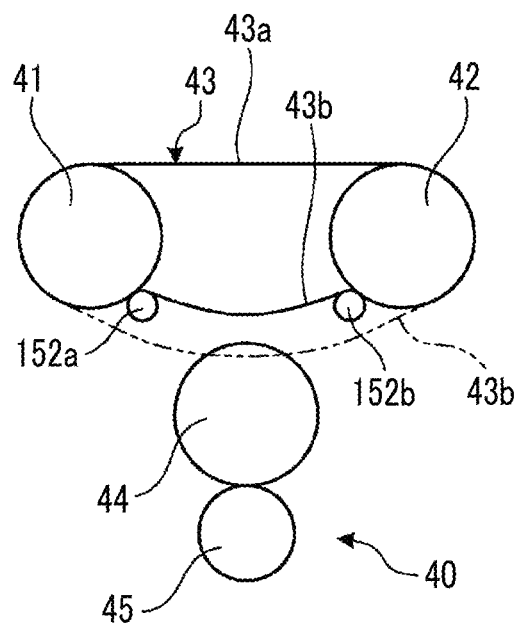
FIG. 9 is a schematic front view showing the support device of a pressurizing belt for a corrugating roll unit.

As shown in FIGS. 8 and 9, a support device 102A of the pressurizing belt for the corrugating roll unit is provided with a belt support mechanism which prevents lowering of the pressurizing belt 43 at the time of the replacement of the corrugating roll unit 40. The belt support mechanism is provided with support rods 152*a* and 152*b* as support members for supporting the lower belt 43*b* of the pressurizing belt 43 wound around the belt roll 41 and the tension roll 42. Further, the belt support mechanism is provided with air cylinders 153*a* and 153*b* as support member moving devices which move the support rods 152*a* and 152*b* to a retracted position where the support rods 152*a* and 152*b* are separated from the pressurizing belt 43 by a predetermined distance and a support position where the support rods 152*a* and 152*b* support the pressurizing belt 43. Specifically, the air cylinders 153*a* and 153*b* are disposed further on the removal direction X2 side than the corrugating roll unit 40 and below the pressurizing belt 43, and can move the support rods 152*a* and 152*b* in the mounting direction X1.

During the operation of the single facer 15, that is, when the pressurizing belt 43 is being moved by the belt roll 41 and the tension roll 42, the pressurizing belt 43 is in contact with the upper corrugating roll 44 (a solid line state in FIG. 7). At this time, the support rods 152*a* and 152*b* are located at a retracted position (a position shown by a two-dot chain line in FIG. 8) where the support rods 152*a* and 152*b* are separated from the pressurizing belt 43, further on the removal direction X2 side than the existing corrugating roll unit 40. Then, when the operation of the single facer 15 is stopped and the corrugating roll unit 40 is replaced, the support rods 152*a* and 152*b* are moved to the mounting direction X1 side by the air cylinders 153*a* and 153*b* and located at a support position (a position shown by a solid line in FIG. 8) where the support rods 152*a* and 152*b* can support the lower belt 43*b*. Here, the existing corrugating roll unit 40 is lowered as shown by a solid line in FIG. 9, and then moved in the removal direction X2 and removed. Subsequently, another corrugating roll unit 40 is moved in the mounting direction X1 to the space where the existing corrugating roll unit 40 has been removed, and then lifted. At this time, since the lower belt 43*b* is supported by the support rods 152*a* and 152*b*, the pressurizing belt 43 does not hang down. For this reason, even if the corrugating roll unit 40 is moved in the removal direction X2 or the mounting direction X1 at the time of the replacement of the corrugating roll unit 40, the corrugating roll unit 40 does not come into contact with the pressurizing belt 43, and thus damage to the pressurizing belt 43 is prevented.

Figure 10:
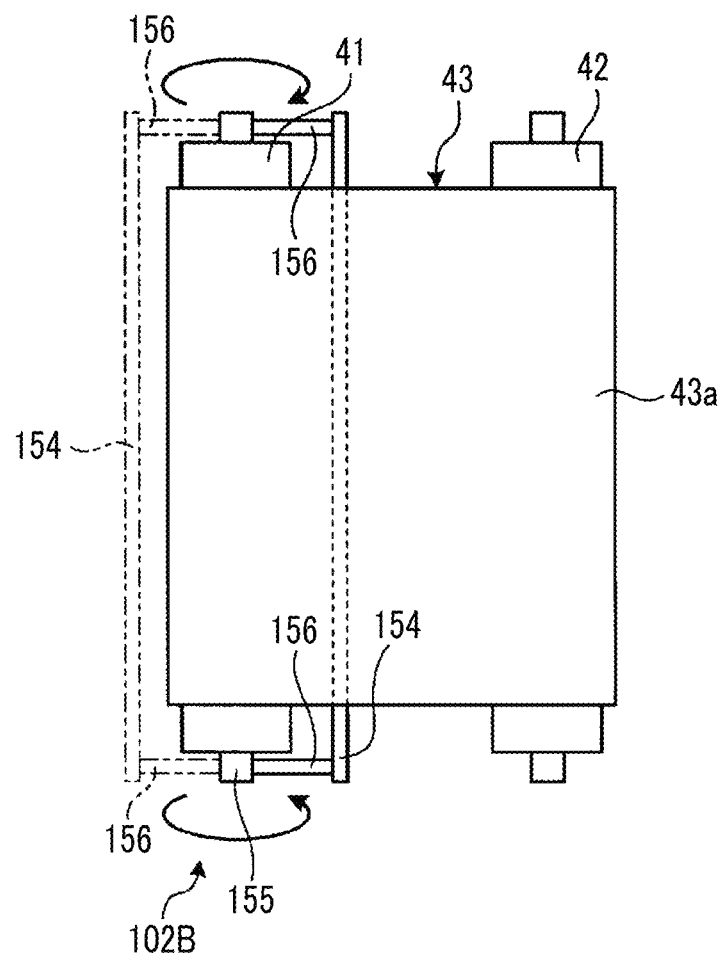
FIG. 10 is a schematic plan view showing a support device of a pressurizing belt for a corrugating roll unit according to a second modification example of the first embodiment.
Figure 11:
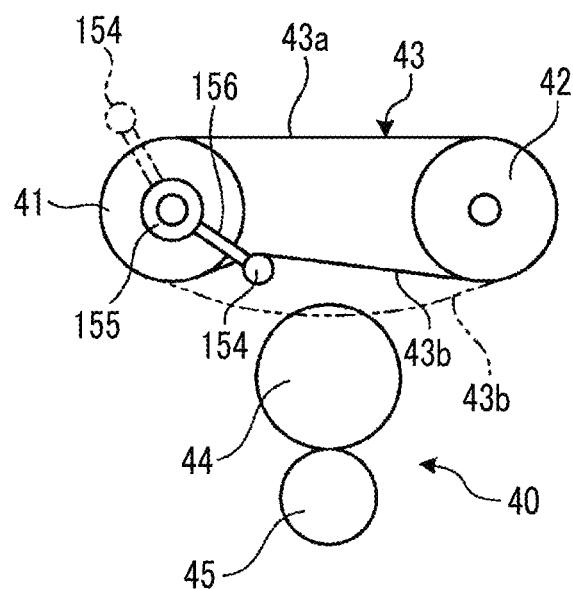
FIG. 11 is a schematic front view showing the support device of a pressurizing belt for a corrugating roll unit.

Further, FIG. 10 is a schematic plan view showing a support device of the pressurizing belt for the corrugating roll unit according to a second modification example of the first embodiment, and FIG. 11 is a schematic front view showing the support device of the pressurizing belt for the corrugating roll unit.

As shown in FIGS. 10 and 11, a support device 102B of the pressurizing belt for the corrugating roll unit is provided with a belt support mechanism which prevents lowering of the pressurizing belt 43 at the time of the replacement of the corrugating roll unit 40. The belt support mechanism is provided with a support rod 154 as a support member for supporting the lower belt 43*b* of the pressurizing belt 43 wound around the belt roll 41 and the tension roll 42. Further, the belt support mechanism is provided with a rotation device 155 as a support member moving device which moves the support rod 154 to a retracted position where the support rod 154 is separated from the pressurizing belt 43 by a predetermined distance and a support position where the support rod 154 supports the pressurizing belt 43. Specifically, the rotation device 155 is provided coaxially with the belt roll 41 and the support rod 154 is connected to the rotation device 155 through a pair of connection rods 156 from the respective axial end portions of the belt roll 41, and the support rod 154 is disposed substantially in parallel to the belt roll 41 on the outside of the belt roll 41. For this reason, the support rod 154 is moved around the rotation center of the belt roll 41 by the rotation device 155 through the connection rods 156, thereby being able to support the lower belt 43*b* of the pressurizing belt 43 from below.

During the operation of the single facer 15, that is, when the pressurizing belt 43 is being moved by the belt roll 41 and the tension roll 42, the pressurizing belt 43 is in contact with the upper corrugating roll 44 (the solid line state in FIG. 7). At this time, the support rod 154 is located at a retracted position (a position shown by a two-dot chain line in FIGS. 10 and 11) where the support rod 154 is separated from the pressurizing belt 43, further on the upper side than the belt roll 41. Then, when the operation of the single facer 15 is stopped and the corrugating roll unit 40 is replaced, the support rod 154 is moved by the rotation device 155 through the connection rods 156 to be located at a support position (a position shown by a solid line in FIGS. 10 and 11) where the support rod 154 support the lower belt 43*b* from below. Here, the existing corrugating roll unit 40 is lowered as shown by the solid line in FIG. 11, and then moved in the removal direction X2 and removed. Subsequently, another corrugating roll unit 40 is moved in the mounting direction X1 to the space where the existing corrugating roll unit 40 has been removed, and then lifted. At this time, since the lower belt 43b is supported by the support rod 154, the pressurizing belt 43 is prevented from hanging down as shown by a two-dot chain line in FIG. 11. For this reason, even if the corrugating roll unit 40 is moved in the removal direction X2 or the mounting direction X1 at the time of the replacement of the corrugating roll unit 40, the corrugating roll unit 40 does not come into contact with the pressurizing belt 43, and thus damage to the pressurizing belt 43 is prevented.

Figure 12:
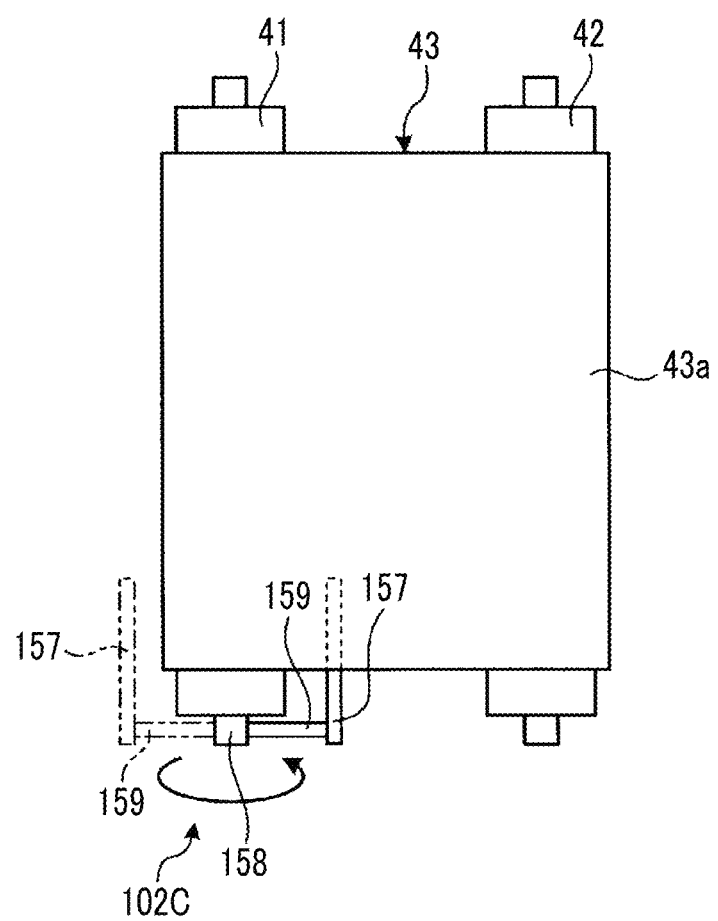
FIG. 12 is a schematic plan view showing a support device of a pressurizing belt for a corrugating roll unit according to a third modification example of the first embodiment.

Further, FIG. 12 is a schematic plan view showing a support device of the pressurizing belt for the corrugating roll unit according to a third modification example of the first embodiment.

As shown in FIG. 12, a support device 102C of the pressurizing belt for the corrugating roll unit is provided with a belt support mechanism which prevents lowering of the pressurizing belt 43 at the time of the replacement of the corrugating roll unit 40. The belt support mechanism is provided with a support rod 157 as a support member for supporting the lower belt 43b of the pressurizing belt 43 wound around the belt roll 41 and the tension roll 42. Further, the belt support mechanism is provided with a rotation device 158 as a support member moving device which moves the support rod 157 to a retracted position where the support rod 157 is separated from the pressurizing belt 43 by a predetermined distance and a support position where the support rod 157 supports the pressurizing belt 43. Specifically, the rotation device 158 is provided coaxially with the belt roll 41 and the support rod 157 is connected to the rotation device 158 through a connection rod 159 from an axial end portion of the belt roll 41, and the support rod 157 is disposed substantially in parallel to the belt roll 41 on the outside of the belt roll 41. In this case, the support rod 157 is cantilevered and extends toward the mounting direction X1 side from further the removal direction X2 side than the pressurizing belt 43. For this reason, the support rod 157 is rotated around the rotation center of the belt roll 41 by the rotation device 158 through the connection rod 159 and moved from a retracted portion (a position shown by a two-dot chain line in FIG. 12) to a support position (a position shown by a solid line in FIG. 12), thereby being able to support the lower belt 43b of the pressurizing belt 43 from below.

The operation of the support device 102C of the pressurizing belt for the corrugating roll unit is substantially the same as the support device 102B of the pressurizing belt for the corrugating roll unit described above, and therefore, description thereof is omitted.

Figure 13:
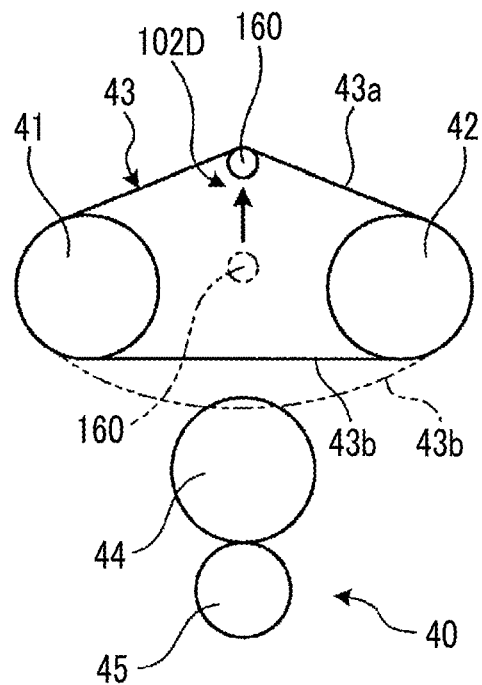
FIG. 13 is a schematic front view showing a support device of a pressurizing belt for a corrugating roll unit according to a fourth modification example of the first embodiment.

Further, FIG. 13 is a schematic front view showing a support device of the pressurizing belt for the corrugating roll unit according to a fourth modification example of the first embodiment.

As shown in FIG. 13, a support device 102D of the pressurizing belt for the corrugating roll unit is provided with a belt support mechanism which prevents lowering of the pressurizing belt 43 at the time of the replacement of the corrugating roll unit 40. The belt support mechanism is provided with a support rod 160 as a support member for supporting the upper belt 43a of the pressurizing belt 43 wound around the belt roll 41 and the tension roll 42. Further, the belt support mechanism is provided with a support member moving device which moves the support rod 160 to a retracted position where the support rod 160 is separated from the pressurizing belt 43 by a predetermined distance and a support position where the support rod 160 supports the pressurizing belt 43, and is, for example, the rotation device 155 or 158 and the connection rod 156 or 159 described above. The support rod 160 is disposed substantially in parallel to the belt roll 41 between the upper belt 43a and the lower belt 43b in the belt roll 41. For this reason, if the support rod 160 is rotated and lifted by the rotation device, the support rod 160 can lift and support the upper belt 43a of the pressurizing belt 43 from below.

During the operation of the single facer 15, that is, when the pressurizing belt 43 is being moved by the belt roll 41 and the tension roll 42, the pressurizing belt 43 is in contact with the upper corrugating roll 44 (the solid line state in FIG. 7). At this time, the support rod 160 is located between the upper belt 43a and the lower belt 43b and at a retracted position where the support rod 160 is separated from the pressurizing belt 43. Then, when the operation of the single facer 15 is stopped and the corrugating roll unit 40 is replaced, the support rod 160 which is located at a position shown by a two-dot chain line in FIG. 13 is lifted to a position shown by a solid line in FIG. 13 and located at a support position where the support rod 160 supports and lifts the upper belt 43a from below. Here, the existing corrugating roll unit 40 is lowered as shown by the solid line in FIG. 13, and then moved in the removal direction X2 and removed. Subsequently, another corrugating roll unit 40 is moved in the mounting direction X1 to the space where the existing corrugating roll unit 40 has been removed, and then lifted. At this time, since the upper belt 43a is lifted and supported by the support rod 160, the pressurizing belt 43 is prevented from hanging down as shown by a two-dot chain line in FIG. 13. For this reason, even if the corrugating roll unit 40 is moved in the removal direction X2 or the mounting direction X1 at the time of the replacement of the corrugating roll unit 40, the corrugating roll unit 40 does not come into contact with the pressurizing belt 43, and thus damage to the pressurizing belt 43 is prevented.

Figure 14:
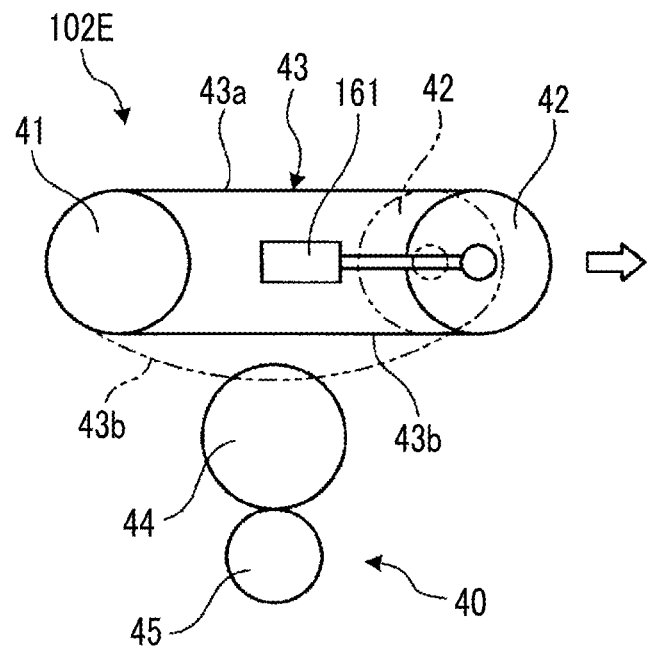
FIG. 14 is a schematic front view showing a support device of a pressurizing belt for a corrugating roll unit according to a fifth modification example of the first embodiment.

Further, FIG. 14 is a schematic front view showing a support device of the pressurizing belt for the corrugating roll unit according to a fifth modification example of the first embodiment.

As shown in FIG. 14, a support device 102E of the pressurizing belt for the corrugating roll unit is provided with a belt support mechanism which prevents lowering of the pressurizing belt 43 at the time of the replacement of the corrugating roll unit 40. The belt support mechanism is a pressurizing force adjusting device capable of adjusting the tension of the pressurizing belt 43 by adjusting the distance between the belt roll 41 and the tension roll 42. The pressurizing force adjusting device has a hydraulic cylinder 161, and a tip portion of a drive rod is connected to a support shaft of the tension roll 42.

During the operation of the single facer 15, that is, when the pressurizing belt 43 is being moved by the belt roll 41 and the tension roll 42, the pressurizing belt 43 is in contact with the upper corrugating roll 44 (the solid line state in FIG. 7). At this time, the tension roll 42 is at a predetermined position, and the tension of the pressurizing belt 43 is adjusted to a desired value. Then, when the operation of the single facer 15 is stopped and the corrugating roll unit 40 is replaced, the hydraulic cylinder 161 is operated to move the tension roll 42 from a retracted position shown by a two-dot chain line in FIG. 14 to a support position shown by a solid line so as to separate the tension roll 42 from the belt roll 41. Here, the existing corrugating roll unit 40 is lowered as shown by the solid line in FIG. 14, and then moved in the removal direction X2 and removed. Subsequently, another corrugating roll unit 40 is moved in the mounting direction X1 to the space where the existing corrugating roll unit 40 has been removed, and then lifted. At this time, since the distance between the belt roll 41 and the tension roll 42 becomes long, the pressurizing belt 43 does not hang down. For this reason, even if the corrugating roll unit 40 is moved in the removal direction X2 or the mounting direction X1 at the time of the replacement of the corrugating roll unit 40, the corrugating roll unit 40 does not come into contact with the pressurizing belt 43, and thus damage to the pressurizing belt 43 is prevented.

Here, a method of replacing a corrugating roll unit by the apparatus for replacing a corrugating roll unit 100 of the first embodiment configured in this manner will be described. FIGS. 16 to 18 are plan views showing the method of replacing a corrugating roll unit of the first embodiment.

The method of replacing a corrugating roll unit by the apparatus for replacing a corrugating roll unit 100 of the first embodiment includes a step of mounting the corrugating roll unit 40 on the second accommodation part N2 with the first accommodation part N1 of the mounting base 111 empty, a step of moving the mounting base 111 to a first replacement position where the first accommodation part N1 faces the existing corrugating roll unit 40, a step of moving the existing corrugating roll unit 40 to the first accommodation part N1 at the first replacement position, a step of moving the mounting base 111 to a second replacement position where the second accommodation part N2 faces the space where the existing corrugating roll unit 40 has been removed, a step of moving the corrugating roll unit 40 of the second accommodation part N2 to the space at the second replacement position, and a step of retracting the mounting base 111 from the second replacement position.

The method of replacing a corrugating roll unit by the apparatus for replacing a corrugating roll unit 100 will be specifically described. As shown in FIGS. 4 and 15, the corrugating roll unit 40 to be newly mounted is mounted on the second accommodation part N2 with the first accommodation part N1 of the mounting base 111 empty, and a worker operates the operating panel 135 to operate the first traveling device 125, thereby moving the mounting base 111 in the mounting direction X1. Then, as shown in FIGS. 4, 15, and 16, the front end portion of the mounting base 111 comes into contact with the stopper 142, so that the mounting base 111 stops, and the worker operates the operating panel 135 to stop the operation of the first traveling device 125. Then, the worker operates the operating panel 135 to operate the lifting device 127, thereby lowering the wheels 132a and 132b. Then, the wheels 132a are fitted to the guide rail 145, and the mounting base 111 is positioned with the minute distance S interposed between itself and the stopper 142. Then, the worker operates the operating panel 135 to operates the second traveling device 126, thereby moving the mounting base 111 along the second horizontal direction Y, and thus the mounting base 111 is moved to the first replacement position where the first accommodation part N1 of the mounting base 111 faces the existing corrugating roll unit 40, and stopped. The stop of the mounting base 111 may be manually performed by the operation of the operating panel 135 by the worker, or may be automatically performed by detecting the mounting base 111 by a detection sensor provided at an appropriate position.

Figure 16:
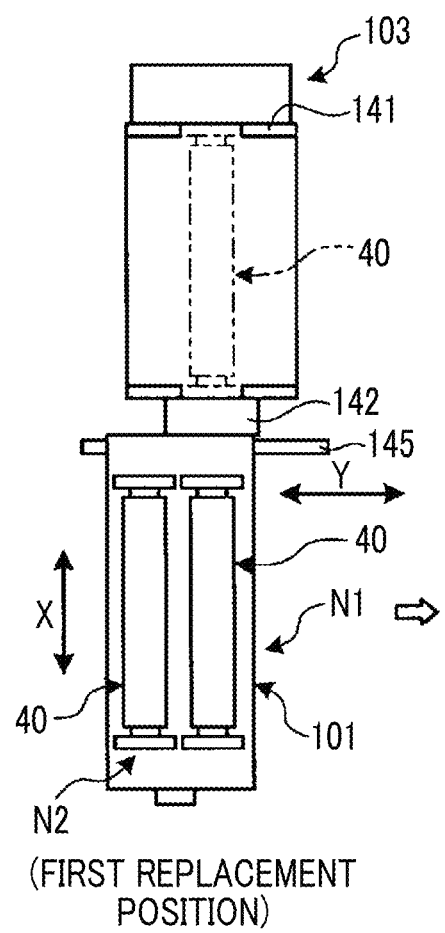
FIG. 16 is a plan view showing a method of replacing a corrugating roll unit.

If the mounting base 111 stops at the first replacement position, as shown in FIG. 16, here, the existing corrugating roll unit 40 is moved to the first accommodation part N1 by the unit replacement mechanism 103. Although not described in detail, the unit replacement mechanism 103 is provided on the single facer 15 side and moves the corrugating roll unit 40 between the frame 141 of the single facer 15 and the corrugating roll unit replacement carriage 101. Further, immediately before the existing corrugating roll unit 40 is moved by the unit replacement mechanism 103, the lowering of the pressurizing belt 43 is blocked by the support device 102 of the pressurizing belt for the corrugating roll unit.

Figure 17:
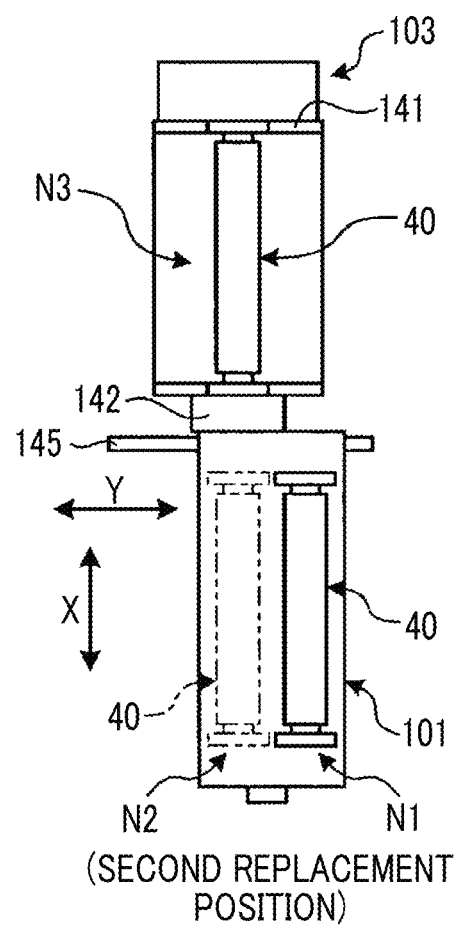
FIG. 17 is a plan view showing the method of replacing a corrugating roll unit.
Figure 18:
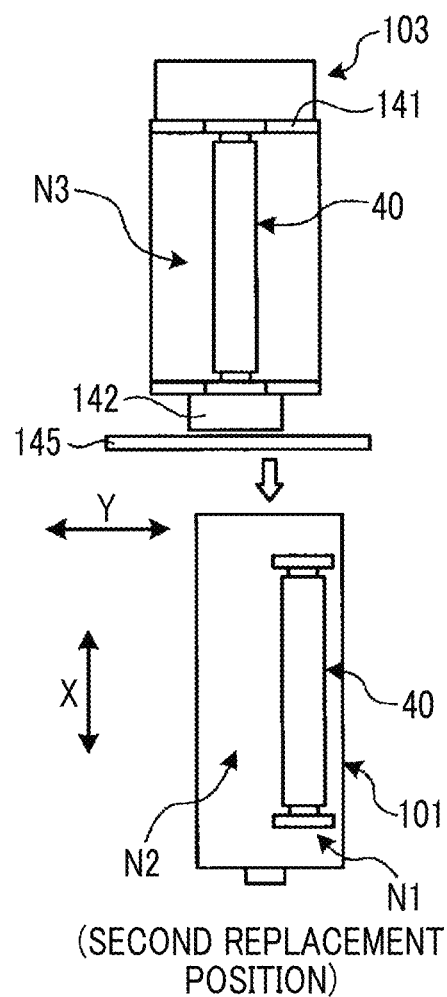
FIG. 18 is a plan view showing the method of replacing a corrugating roll unit.

If the existing corrugating roll unit 40 is accommodated in the first accommodation part N1 of the mounting base 111, as shown in FIGS. 16 and 17, the worker operates the operating panel 135 to operate the second traveling device 126, thereby moving the mounting base 111 along the second horizontal direction Y, and the mounting base 111 is moved to the second replacement position where the second accommodation part N2 of the mounting base 111 faces the space N3 where the existing corrugating roll unit 40 has been removed, and stopped. The stop of the mounting base 111 may be manually performed by the operation of the operating panel 135 by the worker, or may be automatically performed by detecting the mounting base 111 by a detection sensor provided at an appropriate position.

If the mounting base 111 stops at the second replacement position, the corrugating roll unit 40 of the second accommodation part N2 is moved to the space N3 by the unit replacement mechanism 103. If the corrugating roll unit 40 of the second accommodation part N2 is moved to the space N3, the support of the pressurizing belt 43 by the support device 102 of the pressurizing belt for the corrugating roll unit is stopped. Then, as shown in FIGS. 4, 17, and 18, the worker operates the operating panel 135 to operate the lifting device 127, thereby lifting the wheels 132a and 132b. Then, the wheels 132a are separated from the floor surface G, and the front wheels 128a and the rear wheels 128b of the first traveling device 125 are grounded to the floor surface G. Then, the worker operates the operating panel 135 to operates the first traveling device 125, thereby moving the mounting base 111 along the removal direction X2, and the mounting base 111 is retracted from the second replacement position, whereby the replacement work is finished.

In this manner, the corrugating roll unit replacement carriage of the first embodiment includes the mounting base 111 having the first accommodation part N1 for accommodating the corrugating roll unit 40 to be removed and the second accommodation part N2 for accommodating the corrugating roll unit 40 to be mounted, and the movement device 112 which moves the mounting base 111 to the first replacement position where the first accommodation part N1 faces the existing corrugating roll unit 40, the second replacement position where the second accommodation part N2 faces the space N3 where the existing corrugating roll unit 40 has been removed, and the retracted position separated from the first replacement position and the second replacement position.

Therefore, first, if the mounting base 111 is moved from the retracted position to the first replacement position by the movement device 112, the first accommodation part N1 faces the existing corrugating roll unit 40. Here, the existing corrugating roll unit 40 is moved to the first accommodation part N1. Next, the mounting base 111 is moved from the first replacement position to the second replacement position where the second accommodation part N2 faces the space N3 where the existing corrugating roll unit 40 has been removed, by the movement device 112. Here, the corrugating roll unit 40 in the second accommodation part N2 is moved to the space N3 where the existing corrugating roll unit 40 has been removed. Then, the mounting base 111 is moved from the second replacement position to the retracted position by the movement device 112, whereby the replacement work is completed. As a result, it is possible to perform the replacement work of the corrugating roll unit 40 with the movement of one carriage, and thus it is possible to improve the workability of the replacement work of the corrugating roll unit 40 without disturbing various types of work by the worker.

In the corrugating roll unit replacement carriage of the first embodiment, as the movement device 112, the first traveling device 125 which allows the mounting base 111 to travel along the first horizontal direction X which is the mounting direction X1 and the removal direction X2 of the corrugating roll unit 40, the second traveling device 126 which allows the mounting base 111 to travel along the second horizontal direction Y orthogonal to the first horizontal direction X, and the lifting device 127 as a switching device which performs switching so as to be able to selectively use the first traveling device 125 and the second traveling device 126 are provided. Therefore, if the first traveling device 125 is selected and operated, it is possible to allow the mounting base 111 to travel along the first horizontal direction X, and if the second traveling device 126 is selected and operated, it is possible to allow the mounting base 111 to travel along the second horizontal direction Y. For this reason, the mounting base 111 can be smoothly moved to the first replacement position and the second replacement position.

In the corrugating roll unit replacement carriage of the first embodiment, the wheels 132a and 132b of the second traveling device 126 can be lifted and lowered by the lifting device 127. Therefore, the use of the first traveling device 125 and the second traveling device 126 can be easily switched, and thus it is possible to smoothly move the mounting base 111 in a predetermined direction and to simplify a structure.

In the corrugating roll unit replacement carriage of the first embodiment, the guide rails 121 and 122 which move the corrugating roll unit 40 along the mounting direction X1 and the removal direction X2 are provided in the first accommodation part N1 and the second accommodation part N2 of the mounting base 111. Therefore, the corrugating roll unit 40 can be moved in the removal direction X2 by the guide rails 121 and 122 and easily accommodated in the first accommodation part N1, and the corrugating roll unit 40 in the second accommodation part N2 can be moved in the mounting direction X1 by the guide rails 121 and 122 and easily mounted at a predetermined position.

Further, the apparatus for replacing a corrugating roll unit of the first embodiment includes the corrugating roll unit replacement carriage 101, and the unit replacement mechanism 103 which performs removal and mounting of the corrugating roll unit 40 between the single facer 15 and the corrugating roll unit replacement carriage 101. Therefore, since the replacement work of the corrugating roll unit 40 is performed between the single facer 15 and the corrugating roll unit replacement carriage 101 by the unit replacement mechanism 103, it is possible to perform the replacement work of the corrugating roll unit 40 with the movement of one corrugating roll unit replacement carriage 101, and thus it is possible to improve the workability of the replacement work of the corrugating roll unit 40 without disturbing various types of work by the worker.

The apparatus for replacing a corrugating roll unit of the first embodiment includes the belt support mechanism which blocks the lowering of the pressurizing belt 43 at the time of the replacement of the corrugating roll unit 40 composed of the upper and lower corrugating rolls 44 and 45. Therefore, at the time of the replacement of the corrugating roll unit 40, the upper corrugating roll 44 does not come into contact with the pressurizing belt 43, and thus damage to the pressurizing belt 43 can be prevented. As a result, it is possible to improve the workability of the replacement work of the corrugating roll unit 40.

The belt support mechanism operates at the time of the replacement of the corrugating roll unit 40 to block the lowering of the pressurizing belt 43. However, there is no limitation to such an operation. It is preferable to operate the belt support mechanism before the existing corrugating roll unit 40 is moved in the removal direction X2 and accommodated in the first accommodation part N1 of the mounting base 111. However, when the existing corrugating roll unit 40 is removed, the existing corrugating roll unit 40 is lowered and then moved in the removal direction X2, and therefore, the belt support mechanism may be operated after the existing corrugating roll unit 40 is moved in the removal direction X2 and accommodated in the first accommodation part N1 and before the corrugating roll unit 40 in the second accommodation part N2 of the mounting base 111 is moved in the mounting direction X1 to move to the space N3.

In the apparatus for replacing a corrugating roll unit of the first embodiment, as the belt support mechanism, the support member for supporting the pressurizing belt 43 wound around the belt roll 41 and the tension roll 42 is provided. Therefore, since the pressurizing belt 43 is supported by the support member at the time of the replacement of the corrugating roll unit 40, it is possible to easily prevent the contact between the upper corrugating roll 44 and the pressurizing belt 43 with a simple configuration.

In the apparatus for replacing a corrugating roll unit of the first embodiment, the belt support mechanism includes the support member moving device which moves the support member to a retracted position where the support member is separated from the pressurizing belt 43 by a predetermined distance, and a support position where the support member supports the pressurizing belt 43. Therefore, the support member is normally located at the retracted position where the support member is separated from the pressurizing belt 43, so that the operation of the single facer 15 is not hindered. Then, at the time of the replacement of the corrugating roll unit 40, the support member is moved to the support position where the support member supports the pressurizing belt 43, by the support member moving device, and therefore, the support member easily supports the pressurizing belt 43 with a simple configuration, whereby it is possible to prevent the contact between the upper corrugating roll 44 and the pressurizing belt 43.

In the apparatus for replacing a corrugating roll unit of the first embodiment, as the support member, the support rod 152a, 152b, 154, 157, or 160 for supporting the pressurizing belt 43 from below in the vertical direction is provided to be movable. Therefore, at the time of the replacement of the corrugating roll unit 40, the support rod 152a, 152b, 154, 157, or 160 is moved to the support position and supports the pressurizing belt 43 from below, and therefore, it is possible to prevent the contact between the upper corrugating roll 44 and the pressurizing belt 43 by easily supporting the pressurizing belt 43 with a simple configuration.

In the apparatus for replacing a corrugating roll unit of the first embodiment, as the support member, the suction member 151 which suctions the pressurizing belt 43 from above in the vertical direction is provided to be movable up and down. Therefore, at the time of the replacement of the corrugating roll unit 40, the pressurizing belt 43 is suctioned from above by the suction member 151, and therefore, it is possible to prevent the contact between the upper corrugating roll 44 and the pressurizing belt 43 by easily supporting the pressurizing belt 43 with a simple configuration.

In the apparatus for replacing a corrugating roll unit of the first embodiment, as the belt support mechanism, an adjustment device (the hydraulic cylinder 161) for adjusting the distance between the belt roll 41 and the tension roll 42 is provided. Therefore, it is possible to prevent the contact between the upper corrugating roll 44 and the pressurizing belt 43 by easily supporting the pressurizing belt 43 with the existing device.

The apparatus for replacing a corrugating roll unit of the first embodiment includes the corrugating roll unit replacement carriage 101, the stopper 142 which blocks the movement of the mounting base 111 when the mounting base 111 is moved along the mounting direction X1 of the corrugating roll unit 40 by the first traveling device 125, and the unit replacement mechanism 103 which performs removal and mounting of the corrugating roll unit 40 between the single facer 15 and the corrugating roll unit replacement carriage 101. Therefore, first, if the first traveling device 125 is operated to allow the mounting base 111 to travel along the first horizontal direction X1, the mounting base 111 comes into contact with the stopper 142, whereby the movement thereof is blocked, and next, the second traveling device 126 is operated to allow the mounting base 111 to travel along the second horizontal direction Y, thereby moving the mounting base 111 to the first replacement position or the second replacement position. Then, at the first replacement position, the existing corrugating roll unit 40 is moved to the first accommodation part N1 by the unit replacement mechanism 103. Further, at the second replacement position, the corrugating roll unit 40 in the second accommodation part N2 is moved to the space N3 by the unit replacement mechanism 103. Then, the mounting base 111 is moved from the second replacement position to the retracted position by the movement device 112, whereby the replacement work is completed. As a result, it is possible to perform the replacement work of the corrugating roll unit 40 with the movement of one corrugating roll unit replacement carriage 101, and thus it is possible to improve the workability of the replacement work of the corrugating roll unit 40 without disturbing various types of work by the worker.

In the apparatus for replacing a corrugating roll unit of the first embodiment, the minute movement mechanism 143 is provided which moves the mounting base 111 in the removal direction X2 opposite to the mounting direction X1 of the corrugating roll unit 40 by the minute distance S set in advance, from the contact position with the stopper 142. Therefore, when the mounting base 111 has come into contact with the stopper 142, the mounting base 111 is moved in the removal direction X2 by the minute distance S from the contact position by the minute movement mechanism 143, and therefore, it is possible to allow the mounting base 111 to travel in the second horizontal direction Y in a state of being separated from the stopper 142, and thus it is possible to allow the mounting base 111 to smoothly travel.

In the apparatus for replacing a corrugating roll unit of the first embodiment, as the minute movement mechanism 143, the first inclined surfaces 144a and 144b having a convex shape are formed on each of the wheels 132a of the second traveling device 126 and the second inclined surfaces 146a and 146b having a concave shape are formed on the guide rail 145 of the floor surface G. Therefore, when the mounting base 111 has come into contact with the stopper 142, if the lifting device 127 lowers the wheels 132a and 132b, the wheels 132a and 132b are grounded to the floor surface G, and at this time, since the first inclined surfaces 144a and 144b and the second inclined surfaces 146a and 146b come into contact with each other and the mounting base 111 is moved in the removal direction X2 by the minute distance S from the contact position with the stopper 142, it is possible to allow the mounting base 111 to travel in the second horizontal direction Y in a state of being separated from the stopper 142, and thus it is possible to allow the mounting base 111 to smoothly travel.

In the apparatus for replacing a corrugating roll unit of the first embodiment, the support device 102, 102A, 102B, 102C, 102D, or 102E of the pressurizing belt for the corrugating roll unit is provided. Therefore, at the time of the replacement of the upper and lower corrugating roll units 40, lowering of the pressurizing belt 43 is blocked by the belt support mechanism, and therefore, the upper corrugating roll 44 does not come into contact with the pressurizing belt 43, and thus damage to the pressurizing belt 43 can be prevented. As a result, it is possible to improve the workability of the replacement work of the corrugating roll unit 40.

Further, the method of replacing a corrugating roll unit of the first embodiment includes a step of mounting the corrugating roll unit 40 on the second accommodation part N2 with the first accommodation part N1 of the mounting base 111 empty, a step of moving the mounting base 111 to the first replacement position where the first accommodation part N1 faces the existing corrugating roll unit 40, a step of moving the existing corrugating roll unit 40 to the first accommodation part N1 at the first replacement position, a step of moving the mounting base 111 to the second replacement position where the second accommodation part N2 faces the space where the existing corrugating roll unit 40 has been removed, a step of moving the corrugating roll unit 40 of the second accommodation part N2 to the space at the second replacement position, and a step of retracting the mounting base 111 from the second replacement position. Therefore, it is possible to perform the replacement work of the corrugating roll unit 40 with the movement of one corrugating roll unit replacement carriage 101, and thus it is possible to improve the workability of the replacement work of the corrugating roll unit 40 without disturbing various types of work by the worker.

Second Embodiment

Figure 19:
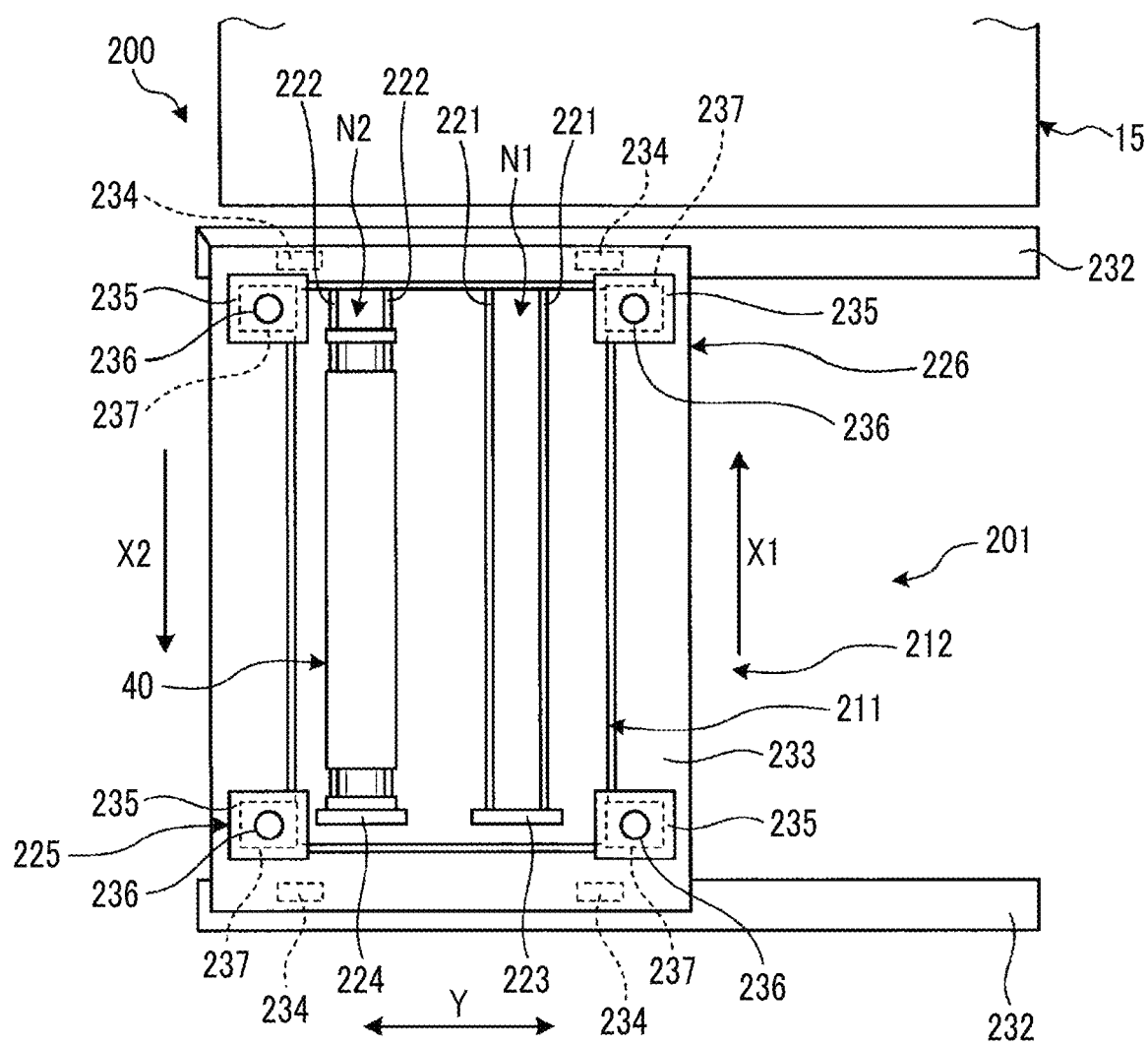
FIG. 19 is a plan view showing an apparatus for replacing a corrugating roll unit of a second embodiment.
Figure 20:
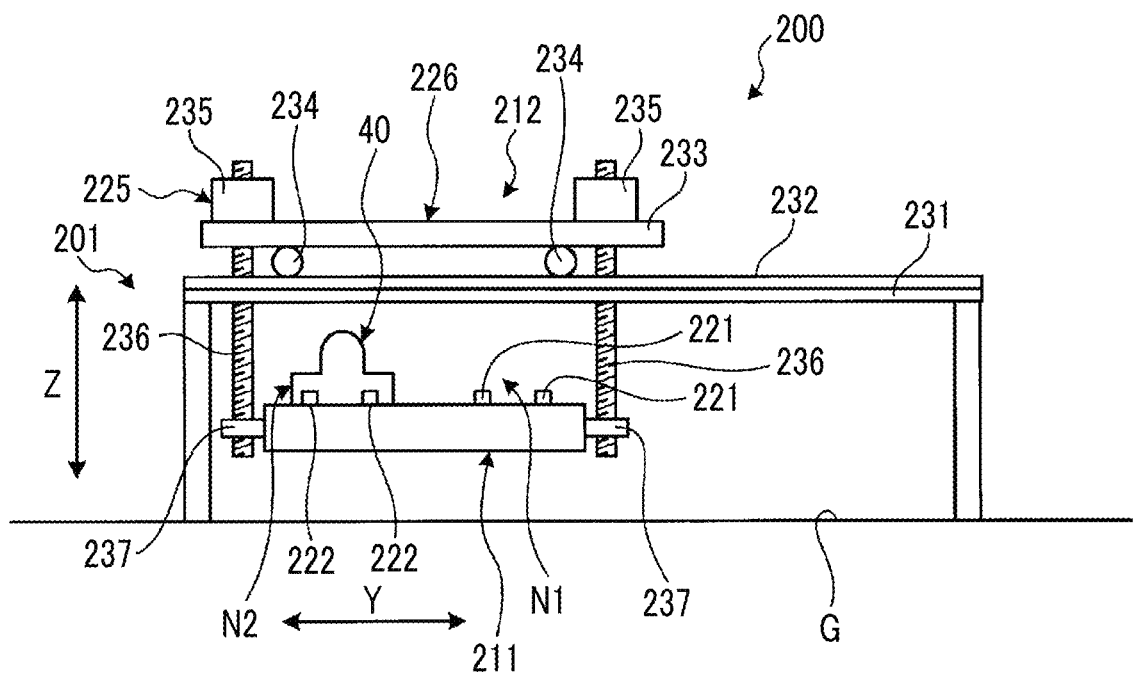
FIG. 20 is a front view showing the apparatus for replacing a corrugating roll unit.

FIG. 19 is a plan view showing an apparatus for replacing a corrugating roll unit of a second embodiment, and FIG. 20 is a front view showing the apparatus for replacing a corrugating roll unit. The members having the same functions as those in the embodiment described above are denoted by the same reference numerals, and detailed description thereof is omitted.

In the second embodiment, as shown in FIGS. 19 and 20, an apparatus for replacing a corrugating roll unit 200 includes a corrugating roll unit conveyance apparatus 201, the support device 102 of the pressurizing belt for the corrugating roll unit, and the unit replacement mechanism 103 (all refer to FIG. 15). Here, the support device 102 of the pressurizing belt for the corrugating roll unit and the unit replacement mechanism 103 are the same as those in the first embodiment, and thus description thereof is omitted.

The corrugating roll unit conveyance apparatus 201 includes a mounting base 211 and a movement device 212. The mounting base 211 has a rectangular plate shape and has the first accommodation part N1 for accommodating the corrugating roll unit 40 to be removed from the single facer 15 and the second accommodation part N2 for accommodating the corrugating roll unit 40 to be mounted to the single facer 15. Then, in the mounting base 111, guide rails (guide members) 221 and 222 which support the corrugating roll unit 40 so as to be able to move the corrugating roll unit 40 along the first horizontal direction X in the first accommodation part N1 and the second accommodation part N2, respectively, are provided at an upper surface portion thereof. Further, the mounting base 211 is provided with contact parts 223 and 224 at the upper surface portion on one end portion side in the longitudinal direction in the guide rails 221 and 222. When the corrugating roll unit 40 is moved in the removal direction X2 by the guide rails 221 and 222 of the mounting base 211, the corrugating roll unit 40 is positioned by coming into contact with the contact parts 223 and 224.

The movement device 212 is composed of a first movement device 225 and a second movement device 226. The first movement device 225 is for lifting and lowering the mounting base 211 along a vertical direction Z, and the second movement device 226 is for traveling the mounting base 211 along the second horizontal direction Y.

That is, a stand 231 is installed adjacent to the single facer 15, and a pair of guide rails 232 is fixed onto the stand 231 along the second horizontal direction Y2. A conveyance stand 233 has a rectangular plate shape and is supported to be movable on the guide rails 232 by a plurality of traveling wheels 234. Then, the conveyance stand 233 can be moved along the second horizontal direction Y by driving and rotating the traveling wheels 234 with a drive device (not shown). The conveyance stand 233 has lifting mechanisms 235 provided on four sides, and a screw shaft 236 is suspended from each of the lifting mechanisms 235, and each screw shaft 236 is screwed to each support portion 237 of the mounting base 211.

The first movement device 225 can lift and lower the mounting base 211 by rotating each of the screw shafts 236 by each of the lifting mechanisms 235. The second movement device 226 can move the mounting base 211 along the second horizontal direction Y through the conveyance stand 233 by driving and rotating the traveling wheels 234 by the drive device.

Figure 21:
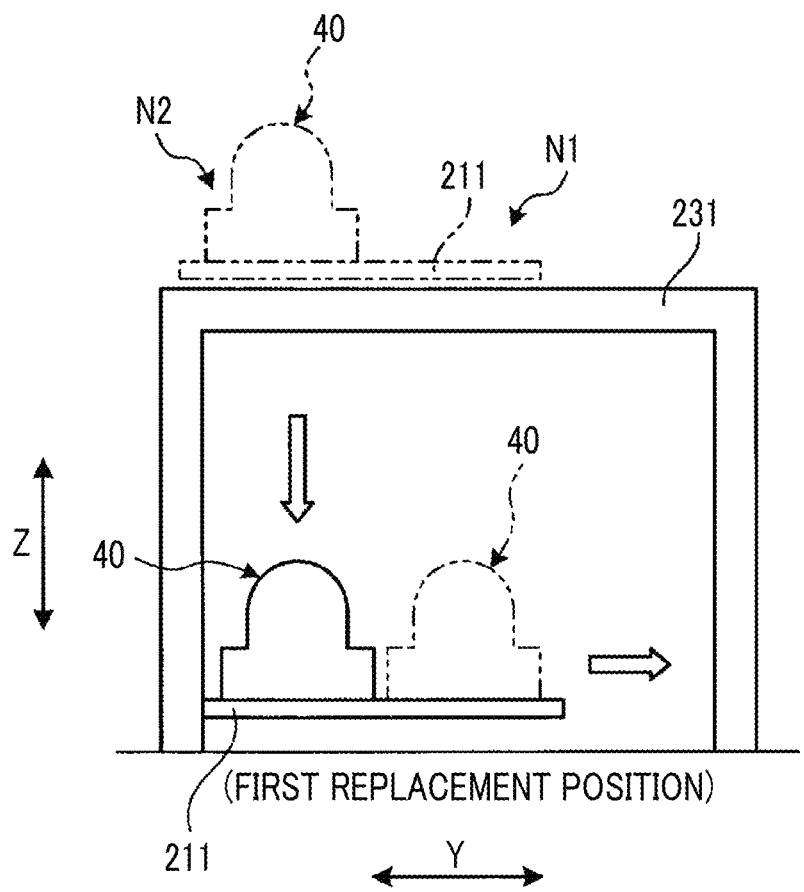
FIG. 21 is a plan view showing a method of replacing a corrugating roll unit of the second embodiment.
Figure 22:
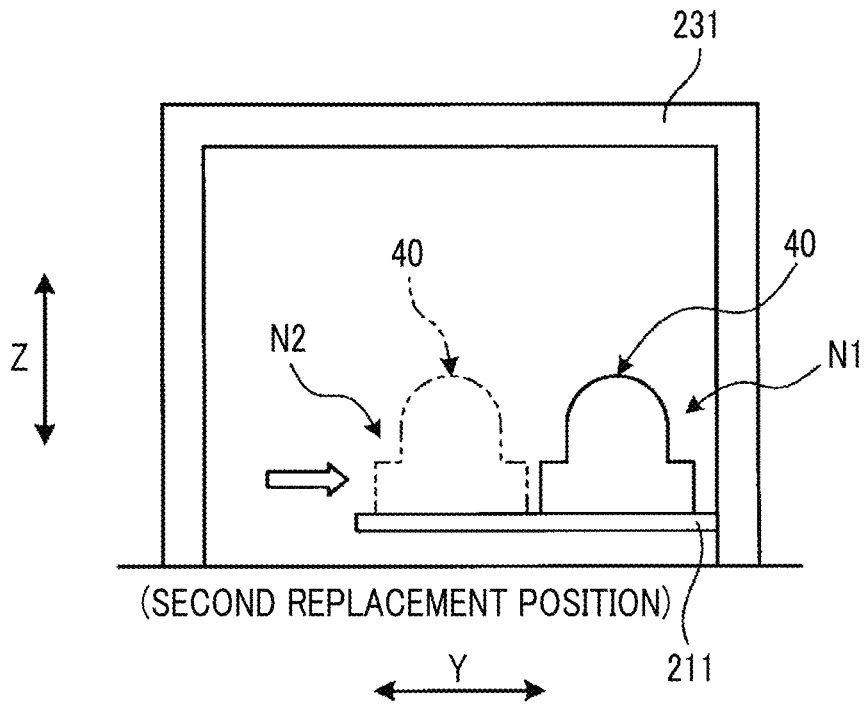
FIG. 22 is a plan view showing the method of replacing a corrugating roll unit.
Figure 23:
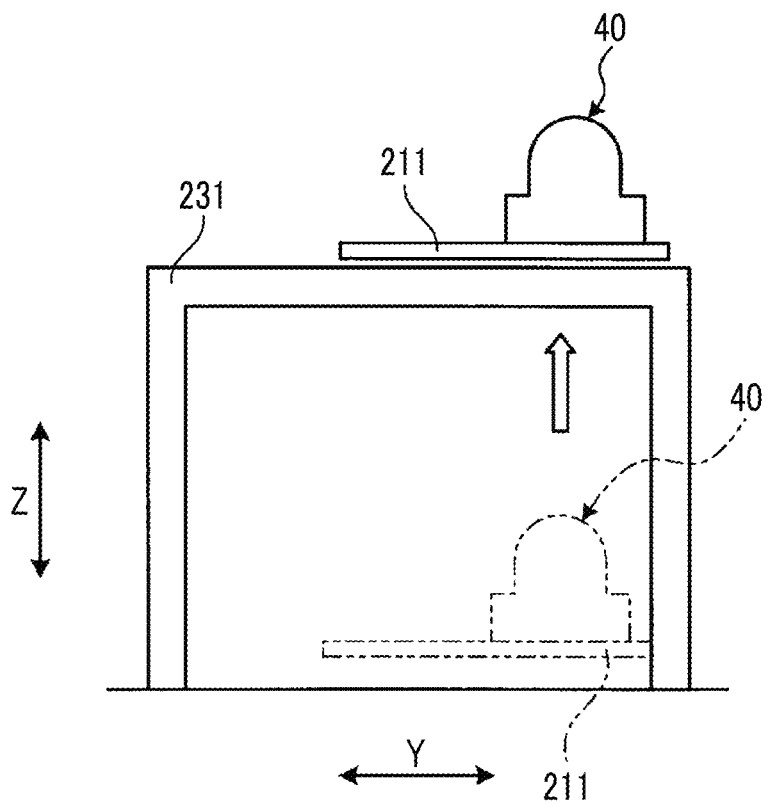
FIG. 23 is a plan view showing the method of replacing a corrugating roll unit.

Here, a method of replacing a corrugating roll unit by the apparatus for replacing a corrugating roll unit 200 of the second embodiment configured in this manner will be described. FIGS. 21 to 23 are plan views showing the method of replacing a corrugating roll unit of the second embodiment.

The method of replacing a corrugating roll unit by the apparatus for replacing a corrugating roll unit 200 of the second embodiment includes a step of mounting the corrugating roll unit 40 on the second accommodation part N2 with the first accommodation part N1 of the mounting base 211 empty, a step of moving the mounting base 211 to the first replacement position where the first accommodation part N1 faces the existing corrugating roll unit 40, a step of moving the existing corrugating roll unit 40 to the first accommodation part N1 at the first replacement position, a step of moving the mounting base 211 to the second replacement position where the second accommodation part N2 faces the space where the existing corrugating roll unit 40 has been removed, a step of moving the corrugating roll unit 40 of the second accommodation part N2 to the space at the second replacement position, and a step of retracting the mounting base 211 from the second replacement position.

As shown in FIGS. 20 and 21, the corrugating roll unit to be newly mounted is mounted on the second accommodation part N2 with the first accommodation part N1 of the mounting base 211 empty, and the first movement device 225 is operated to move the mounting base 211 on the stand 231, which is the retracted position, downward in the vertical direction Z. Then, the mounting base 211 is stopped at a predetermined height position. Subsequently, the second movement device 226 is operated to move the mounting base 211 along the second horizontal direction Y, and the mounting base 211 is moved to the first replacement position where the first accommodation part N1 of the mounting base 211 faces the existing corrugating roll unit 40, and stopped. The stop of the mounting base 111 may be performed manually by the worker or may be automatically performed by a detection sensor detecting the mounting base 211.

If the mounting base 211 stops at the first replacement position, here, the existing corrugating roll unit 40 is moved to the first accommodation part N1 by the unit replacement mechanism 103. Further, immediately before the existing corrugating roll unit 40 is moved by the unit replacement mechanism 103, lowering of the pressurizing belt 43 is blocked by the support device 102 of the pressurizing belt for the corrugating roll unit.

If the existing corrugating roll unit 40 is accommodated in the first accommodation part N1 of the mounting base 111, as shown in FIGS. 21 and 22, the worker operates the second movement device 226 to move the mounting base 211 along the second horizontal direction Y, and thus the mounting base 211 is moved to the second replacement position where the second accommodation part N2 of the mounting base 211 faces the space where the existing corrugating roll unit 40 has been removed, and stopped. The stop of the mounting base 211 may be performed manually by the worker or may be automatically performed by a detection sensor detecting the mounting base 211.

If the mounting base 211 stops at the second replacement position, here, the corrugating roll unit 40 of the second accommodation part N2 is moved to the space by the unit replacement mechanism 103. If the corrugating roll unit 40 of the second accommodation part N2 moves to the space, the support of the pressurizing belt 43 by the support device 102 of the pressurizing roller for the corrugating roll unit is stopped. Then, as shown in FIG. 23, the worker operates the first movement device 225 to move the mounting base 211 upward in the vertical direction Z and retract the mounting base 211 from the second replacement position to the upper side which is a retracted position of the stand 231, whereby the replacement work is finished.

In this manner, the corrugating roll unit replacement carriage of the second embodiment includes the mounting base 211 having the first accommodation part N1 for accommodating the corrugating roll unit 40 to be removed and the second accommodation part N2 for accommodating the corrugating roll unit 40 to be mounted, and the movement device 212 which moves the mounting base 211 to the first replacement position where the first accommodation part N1 faces the existing corrugating roll unit 40, the second replacement position where the second accommodation part N2 faces the space where the existing corrugating roll unit 40 has been removed, and the retracted position separated from the first replacement position and the second replacement position.

Therefore, it is possible to perform the replacement work of the corrugating roll unit 40 with the movement of one carriage, and thus it is possible to improve the workability of the replacement work of the corrugating roll unit 40 without disturbing various types of work by the worker.

In the corrugating roll unit replacement carriage of the second embodiment, as the movement device 212, the first movement device 225 for lifting and lowering the mounting base 211 and the second movement device 226 for moving the mounting base 211 along the second horizontal direction Y are provided. Therefore, if the first movement device 225 is operated, it is possible to lift and lower the mounting base 211, and if the second movement device 226 is operated, it is possible to allow the mounting base 211 to travel along the second horizontal direction Y. For this reason, it is possible to smoothly move the mounting base 211 to the first replacement position and the second replacement position.

The invention claimed is:

1. A corrugating roll unit conveyance apparatus comprising:
   a mounting base having a first accommodation part for accommodating a corrugating roll unit to be removed and a second accommodation part for accommodating a corrugating roll unit to be mounted; and
   a movement device for moving the mounting base to a first replacement position where the first accommodation part faces an existing corrugating roll unit, a second replacement position where the second accommodation part faces a space where the existing corrugating roll unit has been removed, and a retracted position separated from the first replacement position and the second replacement position,
   wherein the first replacement position and the second replacement position are arranged side by side in a second horizontal direction orthogonal to a first horizontal direction which is a mounting direction and a removal direction of the corrugating roll unit, and
   the movement device is adapted to move the mounting base in a sequential manner to a vertical position of the first replacement position along a vertical direction, to the first replacement position along the second horizontal direction, to the second replacement position along the second horizontal direction, and to the retracted position.

2. The corrugating roll unit conveyance apparatus according to claim 1, wherein the movement device includes
   a first traveling device which allows the mounting base to travel along the first horizontal direction,
   a second traveling device which allows the mounting base to travel along the second horizontal direction, and
   a switching device which switches the first traveling device and the second traveling device so as to be selectively used.

3. The corrugating roll unit conveyance apparatus according to claim 2, wherein the switching device is a lifting device for lifting and lowering second traveling wheels of the second traveling device.

4. The corrugating roll unit conveyance apparatus according to claim 1, wherein the movement device includes
   a first movement device for moving the mounting base in the vertical direction, and
   a second movement device for moving the mounting base along the second horizontal direction.

5. The corrugating roll unit conveyance apparatus according to claim 1, wherein the mounting base is provided with a guide member for moving the corrugating roll unit along the removal direction and the mounting direction in the first accommodation part and the second accommodation part.

6. An apparatus for replacing a corrugating roll unit comprising:
   the corrugating roll unit conveyance apparatus according to claim 1; and
   a unit replacement mechanism for removing and mounting the corrugating roll unit between a single facer and the corrugating roll unit conveyance apparatus.

7. An apparatus for manufacturing a cardboard sheet, comprising:
   the apparatus for replacing the corrugating roll unit according to claim 6; and
   the single facer,
   wherein the single facer includes
      upper and lower corrugating rolls for nipping medium paper to perform corrugating on the medium paper,
      an endless pressurizing belt which is wound around a plurality of support rolls and configured to pressurize and join the corrugated medium paper and a liner along with one of the upper and lower corrugating rolls, and
      a belt support mechanism for preventing lowering of the endless pressurizing belt at the time of replacement of the upper and lower corrugating rolls, and
   the endless pressurizing belt is disposed above the upper and lower corrugating rolls.

8. The apparatus according to claim 7, wherein the belt support mechanism includes a support member for supporting the endless pressurizing belt between the plurality of support rolls.

9. The apparatus according to claim 8, wherein the belt support mechanism includes a support member moving device for moving the support member to a retracted position where the support member is separated from the endless pressurizing belt by a predetermined distance and a support position where the support member supports the endless pressurizing belt.

10. The apparatus according to claim 9, wherein the support member is a support rod for supporting the endless pressurizing belt between the plurality of support rolls from below in the vertical direction, and the support member moving device is capable of moving the support rod.

11. The apparatus according to claim 9, wherein the support member is a suction member for suctioning the endless pressurizing belt between the plurality of support rolls from above in the vertical direction, and the support member moving device is capable of lifting and lowering the suction member.

12. The apparatus according to claim 7, wherein the belt support mechanism is an adjustment device for adjusting a distance between the plurality of support rolls.

13. An apparatus for replacing a corrugating roll unit comprising:
   the corrugating roll unit conveyance apparatus according to claim 3;
   a stopper for blocking a movement of the mounting base when the mounting base is moved along the mounting direction of the corrugating roll unit by the first traveling device; and
   a unit replacement mechanism for removing and mounting the corrugating roll unit between a single facer and the corrugating roll unit conveyance apparatus.

14. The apparatus for replacing the corrugating roll unit according to claim 13, further comprising:
   a minute movement mechanism for moving the mounting base in a direction opposite to the mounting direction of the corrugating roll unit by a minute distance set in advance, from a contact position with the stopper.

15. The apparatus for replacing the corrugating roll unit according to claim 14, wherein the lifting device is capable of lifting and lowering the second traveling wheels, and the minute movement mechanism has first inclined surfaces having a convex shape and formed on one of each of the second traveling wheels and a floor surface, and second inclined surfaces having a concave shape and formed on the other of each of the second traveling wheels and the floor surface.

16. A method of replacing a corrugating roll unit comprising:

mounting a corrugating roll unit on a second accommodation part of a mounting base with a first accommodation part of the mounting base empty;

moving the mounting base to a vertical position of a first replacement position where the first accommodation part faces an existing corrugating roll unit along a vertical direction;

moving the existing corrugating roll unit to the first accommodation part at the first replacement position;

moving the mounting base to the first replacement position along a second horizontal direction orthogonal to a first horizontal direction which is a mounting direction and a removal direction of the corrugating roll unit;

moving the mounting base to a second replacement position where the second accommodation part faces a space where the existing corrugating roll unit has been removed, the first replacement position and the second replacement position being arranged side by side in the second horizontal direction;

moving the mounting base to the second replacement position along the second horizontal direction;

moving a corrugating roll unit of the second accommodation part to the space at the second replacement position; and retracting the mounting base from the second replacement position.

* * * * *